(12) United States Patent
Fawcett et al.

(10) Patent No.: US 7,644,088 B2
(45) Date of Patent: Jan. 5, 2010

(54) SYSTEMS AND METHODS FOR RETRIEVING DATA

(75) Inventors: John Fawcett, Lowell, MA (US); Nader Akhnoukh, Somerville, MA (US); Daniel Dias, Boston, MA (US)

(73) Assignee: Tamale Software, Boston, MA (US)

( * ) Notice: Subject to any disclaimer, the term of this patent is extended or adjusted under 35 U.S.C. 154(b) by 666 days.

(21) Appl. No.: 10/987,375

(22) Filed: Nov. 12, 2004

(65) Prior Publication Data
US 2005/0108262 A1    May 19, 2005

Related U.S. Application Data

(63) Continuation-in-part of application No. 10/712,076, filed on Nov. 13, 2003.

(51) Int. Cl.
*G06F 17/00* (2006.01)
*G06F 15/16* (2006.01)

(52) U.S. Cl. .................. 707/100; 707/2; 704/9; 704/227; 705/1; 705/2; 705/7; 709/223

(58) Field of Classification Search ............ None
See application file for complete search history.

(56) References Cited

U.S. PATENT DOCUMENTS

| | | | |
|---|---|---|---|
| 5,649,182 A | 7/1997 | Reitz | 395/607 |
| 5,649,188 A | 7/1997 | Nomura et al. | 395/611 |
| 5,799,303 A | 8/1998 | Tsuchimura | 707/7 |
| 5,842,218 A | 11/1998 | Robinson | 707/102 |
| 5,963,954 A | 10/1999 | Burrows | 707/102 |
| 6,023,723 A | 2/2000 | McCormick et al. | 709/206 |
| 6,055,515 A | 4/2000 | Consentino et al. | 705/27 |
| 6,112,209 A | 8/2000 | Gusack | 707/101 |
| 6,226,632 B1 | 5/2001 | Takahashi et al. | 707/3 |
| 6,233,583 B1 | 5/2001 | Hoth | 707/102 |
| 6,493,703 B1 | 12/2002 | Knight et al. | 707/3 |
| 6,546,390 B1 | 4/2003 | Pollack et al. | 707/7 |
| 6,618,732 B1 | 9/2003 | White et al. | 707/103 |
| 7,103,607 B1 * | 9/2006 | Kirkwood et al. | 707/102 |
| 2001/0021930 A1 | 9/2001 | Bouve et al. | 707/7 |
| 2002/0010700 A1 | 1/2002 | Wotring et al. | 707/100 |

(Continued)

OTHER PUBLICATIONS

International Search Report for PCT/US2004/038641 dated Feb. 17, 2005.

(Continued)

*Primary Examiner*—Cam Y T Truong
*Assistant Examiner*—Dung K Chau
(74) *Attorney, Agent, or Firm*—Goodwin Procter LLP

(57) ABSTRACT

This invention relates to a computer-based method and system for facilitating the retrieval, classification, and distribution of information. In one embodiment, a method for providing information comprises providing a plurality of entities, each having an entity type, providing a plurality of relationships among the entities, each relationship having a relationship type and direction, and constructing an entity-relationship network comprising the entities and relationships. The method further includes receiving a plurality of information items, facilitating the association of the information items with at least one corresponding entity, receiving a request for information items associated with a selected one of the entities, determining a subset of the entities based on the selected entity, the relationships, the relationship types and the relationship directions, and providing the information items associated with the subset of the entities.

25 Claims, 18 Drawing Sheets

U.S. PATENT DOCUMENTS

| | | | |
|---|---|---|---|
| 2002/0107853 A1 | 8/2002 | Hofmann et al. | 707/7 |
| 2002/0116380 A1 | 8/2002 | Chen et al. | 707/7 |
| 2002/0128734 A1 | 9/2002 | Dorsett | 700/73 |
| 2002/0128947 A1* | 9/2002 | Sauter et al. | 705/37 |
| 2002/0136381 A1 | 9/2002 | Shaffer et al. | 379/201.02 |
| 2002/0143763 A1 | 10/2002 | Martin, Jr. et al. | 707/7 |
| 2002/0194037 A1 | 12/2002 | Creed et al. | 705/5 |
| 2003/0014490 A1 | 1/2003 | Bates et al. | 709/206 |
| 2003/0018616 A1* | 1/2003 | Wilbanks et al. | 707/2 |
| 2003/0041050 A1 | 2/2003 | Smith et al. | 707/1 |
| 2003/0050929 A1 | 3/2003 | Bookman et al. | 707/7 |
| 2003/0131013 A1* | 7/2003 | Pope et al. | 707/100 |
| 2003/0187813 A1 | 10/2003 | Goldman et al. | 707/1 |
| 2003/0236768 A1* | 12/2003 | Sribhibhadh et al. | 707/1 |
| 2004/0015470 A1 | 1/2004 | Smith et al. | 707/1 |
| 2004/0015473 A1 | 1/2004 | Trappen et al. | 707/1 |
| 2004/0015487 A1 | 1/2004 | Lin et al. | 707/3 |
| 2004/0015489 A1 | 1/2004 | Anonsen et al. | 707/3 |
| 2004/0015496 A1 | 1/2004 | Anonsen | 707/4 |
| 2004/0015506 A1 | 1/2004 | Anonsen et al. | 707/100 |
| 2004/0015516 A1* | 1/2004 | Harter et al. | 707/104.1 |
| 2004/0015814 A1 | 1/2004 | Trappen et al. | 717/100 |
| 2004/0019599 A1 | 1/2004 | Trappen et al. | 707/102 |
| 2004/0088117 A1 | 5/2004 | Dorsett | 702/22 |
| 2004/0176967 A1 | 9/2004 | Whittenberger | 705/1 |
| 2004/0181440 A1 | 9/2004 | Yeh et al. | 705/7 |
| 2004/0181502 A1 | 9/2004 | Yeh et al. | 707/1 |
| 2004/0181538 A1 | 9/2004 | Lo et al. | 707/100 |
| 2005/0010394 A1* | 1/2005 | Bergeron et al. | 704/9 |
| 2005/0033583 A1* | 2/2005 | Bergeron et al. | 704/277 |
| 2005/0071362 A1* | 3/2005 | Nelson et al. | 707/102 |
| 2006/0173672 A1* | 8/2006 | Bergeron et al. | 704/9 |

OTHER PUBLICATIONS

Written Opinion of the International Searching Authority for PCT/US2004/038641 dated Feb. 17, 2005.

"KBMS-Prototype KRISYS User Manual Overview," Dec. 1992, pp. 1-94.

Mattos et al., "Grand Tour of Concepts for Object-Orientation from a Database Point of View," Data & Knowledge Engineering, vol. 9, No. 3, 1992, pp. 321-352.

Pollitt et al., "Hibrowse: Adding the Power of Relational Databases to the Traditional IR Architecture—The Future for Graphic User Interfaces," Information Retrieval. New Systems and Current Research. Proceedings of the Research Colloquium of the British Computer Society Systems and Current Research, Mar. 29, 1993.

Zhang et al., "On a Buzzword "Extensibility"—What We Have Learned from the the ORIENT Project?" Database Engineering and Applications, 1999. Ideas '99. International Symposium Proceedings Montreal, Que., Canada Aug. 2-4, 1999, Los Alamitos, CA, USA, IEEE Comput. Soc. US, Aug. 2, 1999, pp. 360-369.

Patents Act 1977 Examination Report under Section 18(3), for GB0610958.1, dated Dec. 5, 2006.

Communication pursuant to Article 96(2) EPC for Application No. 04 811 368.2-2201, dated Nov. 15, 2006.

"Introduction to Lotus Notes," http://www.bristolcommunitycollege.edu/pgrocer/cis40/intro/lotnots99.html (9 pgs.) retrieved from Internet on May 27, 2003.

Lowery, T. "Beginners Guide to Lotus Notes and Domino," *Domino Power Magazine*; http://www.bristolcommunitycollege.edu/pgrocer/cis20/intro/lotnots99.html (4 pgs.) retrieved from Internet on May 27, 2003.

Chen, P., "The Entity-Relationship Model—Toward a Unified View of Data," ACM Transactions on Database Systems, 1(1): 9-36 (Mar. 1976).

Gordon D. et al., "Containment Modeling of Content Management Systems," pp. 9-14 (Aug. 2002).

Keller R. et al., "Design and Implementation of a UML-based Design Repository."

Pan, K. et al., "Hypertext Versioning for Embedded Link Models" (2004).

Van Schooten, B., "Structuring distributed virtual environments using a relational database model," http://www.home.cs.utwente.nl/~schooten/dsvis-schooten-final/dsvis-schooten-final.html, retrieved from the internet on Sep. 30, 2004, 14 pgs.

Whitehead, E.J. Jr. et al., "Uniform Comparison of Configuration Management Data Models" (2003).

Whitehead, E.J. Jr., "Uniform Comparison of Data Models Using Containment Modeling" (2002).

Whitehead, E.J. Jr. et al., "Automatic Generation of Hytpertext System Repositories A Model Driven Approach" (2004).

* cited by examiner

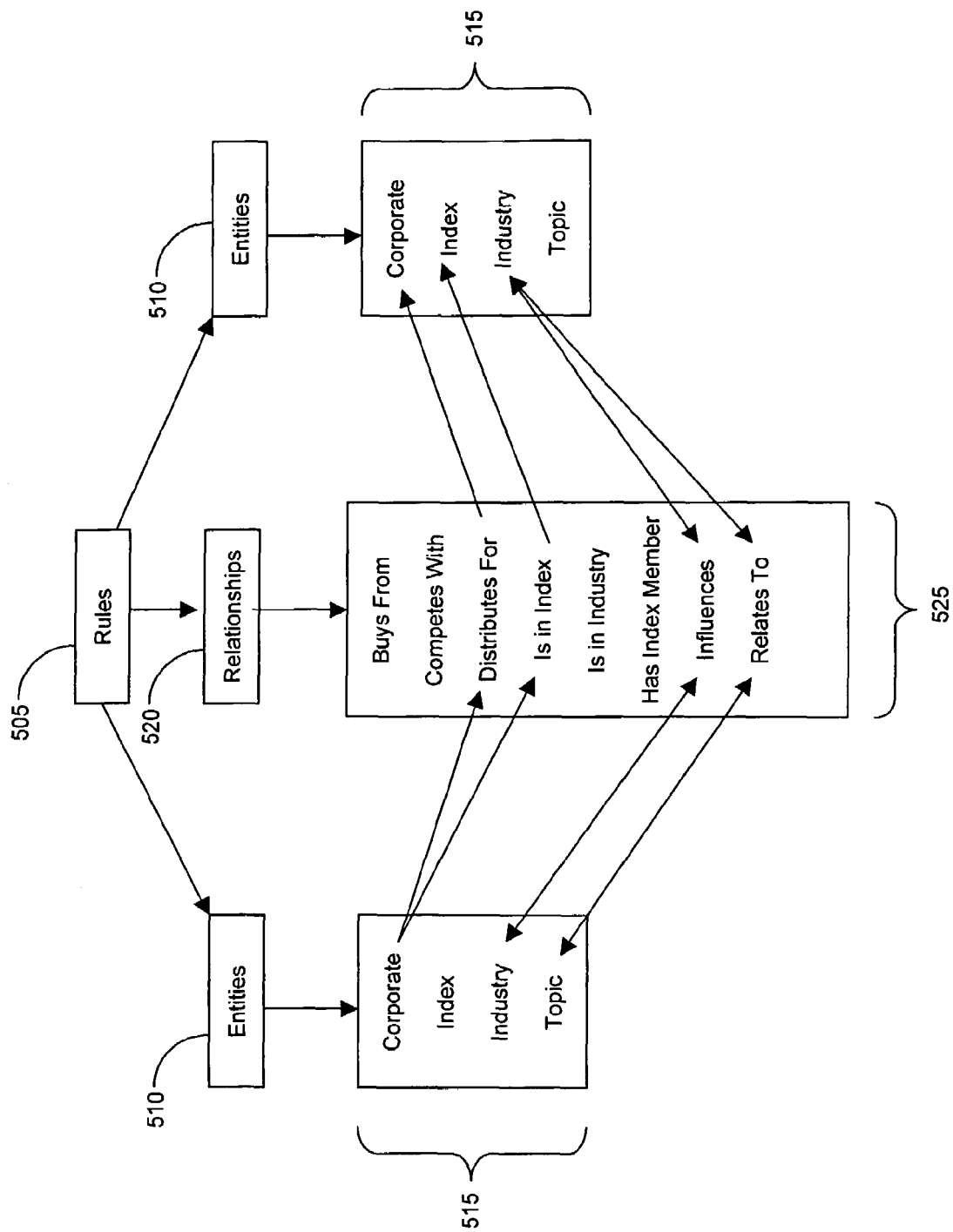

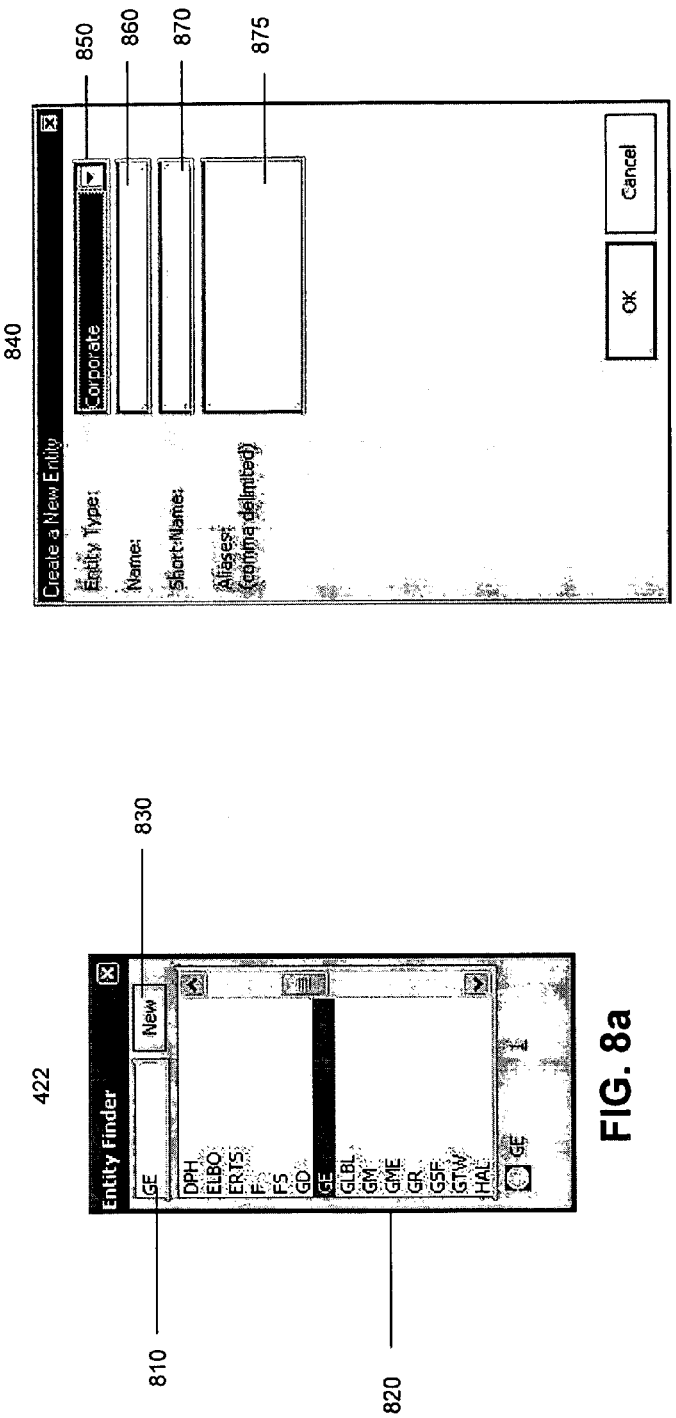
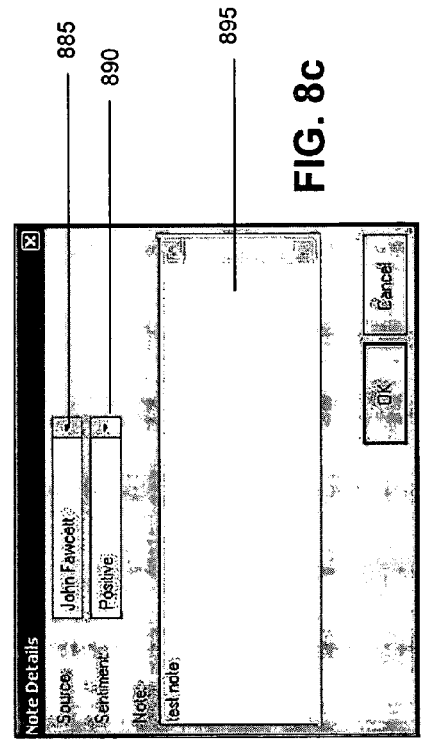
FIG. 8a
FIG. 8b
FIG. 8c

FIG. 9

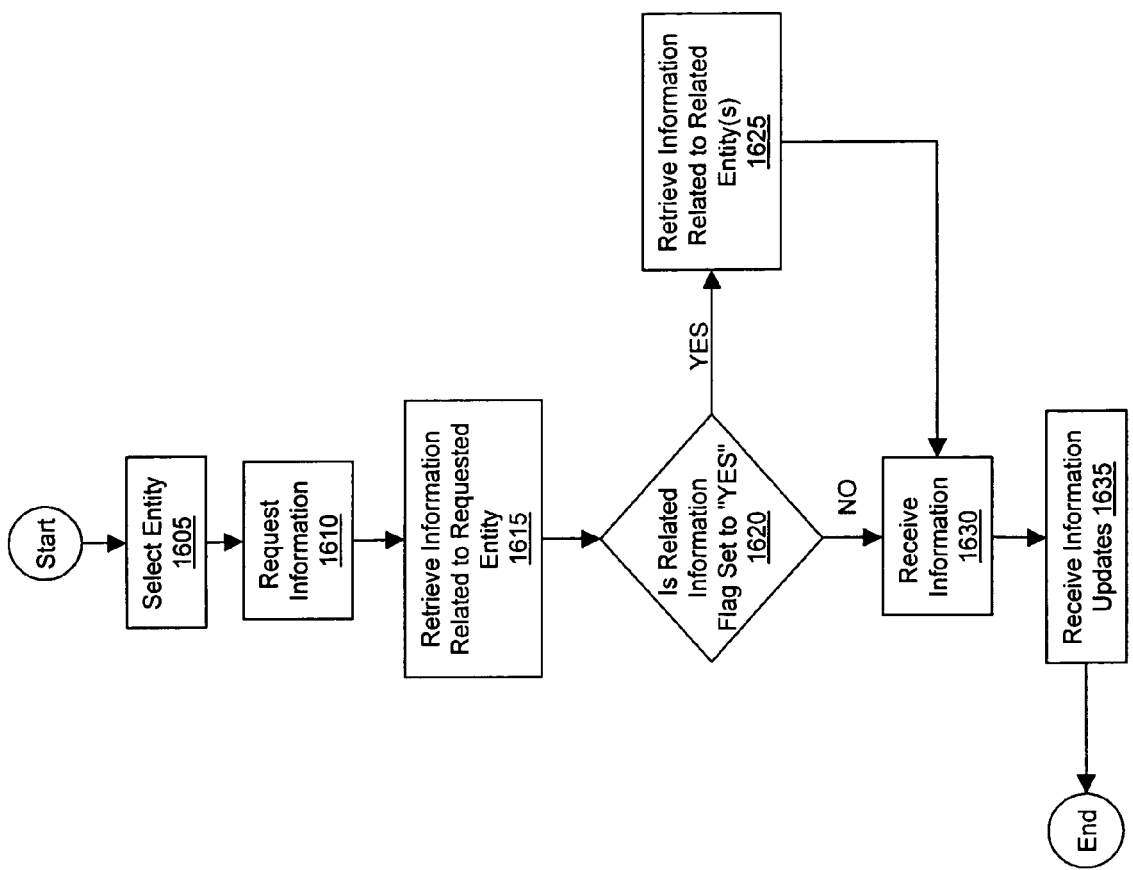

SYSTEMS AND METHODS FOR RETRIEVING DATA

CROSS-REFERENCE TO RELATED APPLICATIONS

This application is a continuation-in-part of co-pending U.S. patent application Ser. No. 10/712,076, entitled "Systems and Methods for Retrieving Data", filed on Nov. 13, 2003.

TECHNICAL FIELD

This invention relates to computer-based methods and systems for retrieving, organizing, and distributing data and, more particularly, to computerized methods and systems for retrieving, organizing, and distributing financial research data.

BACKGROUND INFORMATION

The data available to individuals and institutions that monitor the global financial markets is wide-ranging. Investment professionals who may be responsible for monitoring a particular company or industry sector may receive thousands of individual information items each day. Some of these information items may be presented in well-formatted and categorized formats from reliable and well-known sources such as financial statements filed with a stock exchange or the Securities and Exchange Commission, whereas other information items may be in the form of informal correspondence such as email or instant message, phone conversations, or face to face meetings. Furthermore, the application of numerous internet communications technologies to the research and information publishing process over the last decade has increased the volume of information available for analysis and the speed at which it is delivered. Often, opportunities to take advantage investment opportunities based on such information, may exist for only a short time. Furthermore, the opportunity to act on information may not be concurrent with the arrival of the information itself. It is critical that investment professionals be able to monitor the numerous sources of information, discern pertinent information from irrelevant information, analyze it as quickly as possible and base decisions on the information as it arrives. Investment professionals must therefore be able analyze, in short periods of opportunity, historic information that is often difficult and time-consuming to recall or retrieve manually.

In addition to being able to understand information relating to a primary investment of interest—e.g. information relating to a specific company or industry—an effective investment professional must also immediately understand and appreciate so-called "derivative influences." Examples of derivative influences might include information about a company's industry, a competitor, a supplier, a geographic region, or any subject that is somehow "related" to a primary investment. However, expanding the universe of relevant information to include these derivative influences often exponentially increases the volume of information an investment professional must review. As a result, investment professionals also expend an increasing portion of their research efforts discovering and exploring the derivative influences on investments. As the breadth of derivative influences increases, the rate at which a single investment professional can retain and recall the relationships among various research sources falls behind the rate the research information is produced and delivered. Further complicating the process, when an investment professional receives information pertaining to a particular investment, there may be numerous other investments that are indirectly affected by the information. This universe of affected entities in which one can invest is constantly changing, as companies are bought and sold, enter new markets, and forge new partnerships.

The same performance pressures apply to an investment firm as a whole. To be effective, all members of the firm want to share information in real time, and allow individuals to rapidly sort and distribute the massive amounts of information available. At the same time, the fundamental research basis of a firm's investment decisions are coming under greater scrutiny, and heightening the need for a clear research audit trail.

Therefore, to be effective, an investment professional must become increasingly productive with respect to the receipt, review, and recording of information such that he can adequately support the investments made by the firm.

SUMMARY OF THE INVENTION

In general, the invention relates to computer based tools that allow investment professionals to associate information with a particular entity upon receipt, and to further facilitate the retrieval, update, and distribution of that information, either upon request or in real-time. Such tools allow investment professionals, who can be responsible for providing investment advice and/or making investment decisions, to identify and record the derivative influences affecting an investment through the use of an entity/relationship model where the entities represent any topic on which research can be conducted, and the relationships represent the influences the topics exert on one another. The investment professional can classify information according to one entity (which, for example, may be a legal entity, an industry, a market grouping, a topic, or other area of interest) and define and modify relationships among the entities. The defined relationships allow an investment professional to query the tools for information about a first entity, and obtain in response "indirect" or "derivative" information associated with other entities that have defined relationships, (either direct or indirect) with the first entity. In some cases, information relating to entities that are indirectly related to an entity having one or more degrees of separation (with each degree of separation in this context denoting one direct relationship between two entities) may be returned. Thus, entities are identified that are not directly related to the first entity, where the set of direct or indirect relationships connecting the entities are such that information associated with a distant entity may still be relevant to the selected entity. The ability to quickly receive, retrieve, and evaluate the information associated with a relevant entity can help investment professionals make investment decisions.

Such tools also can facilitate the easy capture, storage, retrieval, and distribution of the great variety of information available to investment professionals in its various forms (e.g. email, instant message, document, newswire release, etc.) without an analyst having to remember or determine all of the numerous companies, industries, or entities to which the information might pertain. Such a system allows a user to quickly assign an information item to a primary entity (or other topic), and to use centrally stored relationships among the entities and rules governing the use of the relationship to determine if there are additional entities may be affected by the information.

Moreover, a system that stores the entities, the relationships, and the rules governing the use and creation of the relationships in a central database, while distributing access to view and modify the central entity/relationship model in real-time, can allow multiple users of the system to benefit from the combined knowledge and experience of all the current and previous users. In addition, if an individual analyst with specific knowledge were unavailable, the knowledge of the relationships between entities remains available to other users. Thus, relationships become institutional knowledge, and can be leveraged into productivity enhancements and a strategic advantage over other competing investment houses.

While particularly useful for investment professionals, these collaborative research tools are not limited to that field, and can be used in many other areas with great advantage.

In one aspect, a plurality of entities and a plurality of relationships among the entities are provided, each entity having a entity type and each relationship having a relationship type and relationship direction. An entity-relationship network is created using the entities and the relationships. A plurality of information items is received, and each information item is associated with at least one corresponding entity. Further, a request for information items associated with a selected entity is received. Based on the selected entity, the relationship types and relationship directions of the entity-relationship network, a subset of the plurality of entities is determined. The information items associated with the subset of entities is then provided.

In some embodiments, the entities in the subset include (i) entities that have a direct relationship with the selected entity, the relationship having one of a number of predetermined relationship types and a direction; and (ii) entities that have an indirect relationship with the selected entity in which each relationship relating such an identified entity with the selected entity has the same predetermined type and direction.

An entity can be any sort of topic. In the investment context, the entity can be, for example, a company, an industry, an index, a person or a subject. The relationships between the topics can have a direction or directions. For example, a relationship can be unidirectional—e.g. from the first entity to the second entity or from the second entity to the first topic, bi-directional—e.g. from the first entity to the second entity and from the second entity to the first entity, or hierarchical—e.g. a parent entity can include one or more child entities. Where the relationship is bi-directional, the relationship can represent a reciprocal relationship i.e., the creation of one relationship from a first entity to a second entity implies a second relationship from the second entity to the first, thus reducing the time needed to specify a set of relationships among many entities. The relationship can also include a strength indicator to indicate how closely related one entity is to another, for example, how strong of an influence exists between the entities. As non-limiting examples, the relationship between the entities can have a relationship type. For example, a legal relationship (e.g., parent-subsidiary, or licensor-licensee), a business relationship (e.g., customer, supplier, distributor, competitor, or industry member/participant), formal membership requirements (e.g., a company that is part of particular stock market index), informal (e.g., a company that belongs to a standards consortium) or influential (e.g., a political issue impacts the performance of a company). In some instances, the relationships in the network can include both hierarchical and influential relationships.

The information can be in any format that can be stored and/or identified. Examples include electronic messages, emails, instant messages, financial reports, voicemails, web pages, research reports, electronic documents, press releases, etc. The information can be received using one of more communications avenues, including electronic messaging, electronic mail, instant messaging, voice messaging, scheduled database query, or triggered database query.

A first user of a first computer can associate information items with entities, and a second user of a second computer can request the information items associated with the association defined by the first user. The second user can request information associated with the selected entity, and in some embodiments, receive information associated with the subset of entities via email, voicemail, screen display, personal data assistant, and print.

In general, in yet another aspect, the invention relates to systems for providing the tools just described. For example, one such system for presenting information comprises a entity definition module for defining entities, a relationship definition module for defining relationships among the entities and attributing a relationship type and relationship direction to each relationship, a receiver for receiving information, an information management module for associating the received information with at least one of the entities, an information retrieval module for, upon receiving a request for information associated with the one of the entities, retrieving information associated with a subset of the entities, the subset based, at least in part, on the relationship types and relationship directions among the entities in the subset, and a display module for presenting the retrieved data. These modules can be implemented, for example, with computer software in conjunction with computer hardware (e.g., networked computers).

The system can include a database module for storing one or more of the entities, the relationships, the information, and the association of information with entities. The system may also include a rules engine for governing the relationships between the entities. In some embodiments, the system may further include a messaging module for distributing modifications to one or more of the entities, relationships, and rules. The messaging module can distribute the modifications asynchronously as the changes are made, or in some embodiments, upon demand by the user. The system may also include a permissions module for enforcing user access privileges to one or more of the entities, the relationships, and the information associated with the entities.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 5 is a block diagram of an embodiment of a system according to the invention.

FIG. 8a is a screen display of the entity finder module in an embodiment of the client of FIG. 4.

FIG. 8b is a screen display of the create new entity module in an embodiment of the client of FIG. 4.

FIG. 8c is a screen display of the notes module in an embodiment of the client of FIG. 4.

FIG. 9 is a screen display of the entity details module in an embodiment of the client of FIG. 4.

FIG. 16 is a flowchart of an embodiment of a method according to the invention.

DETAILED DESCRIPTION

Figure 1:
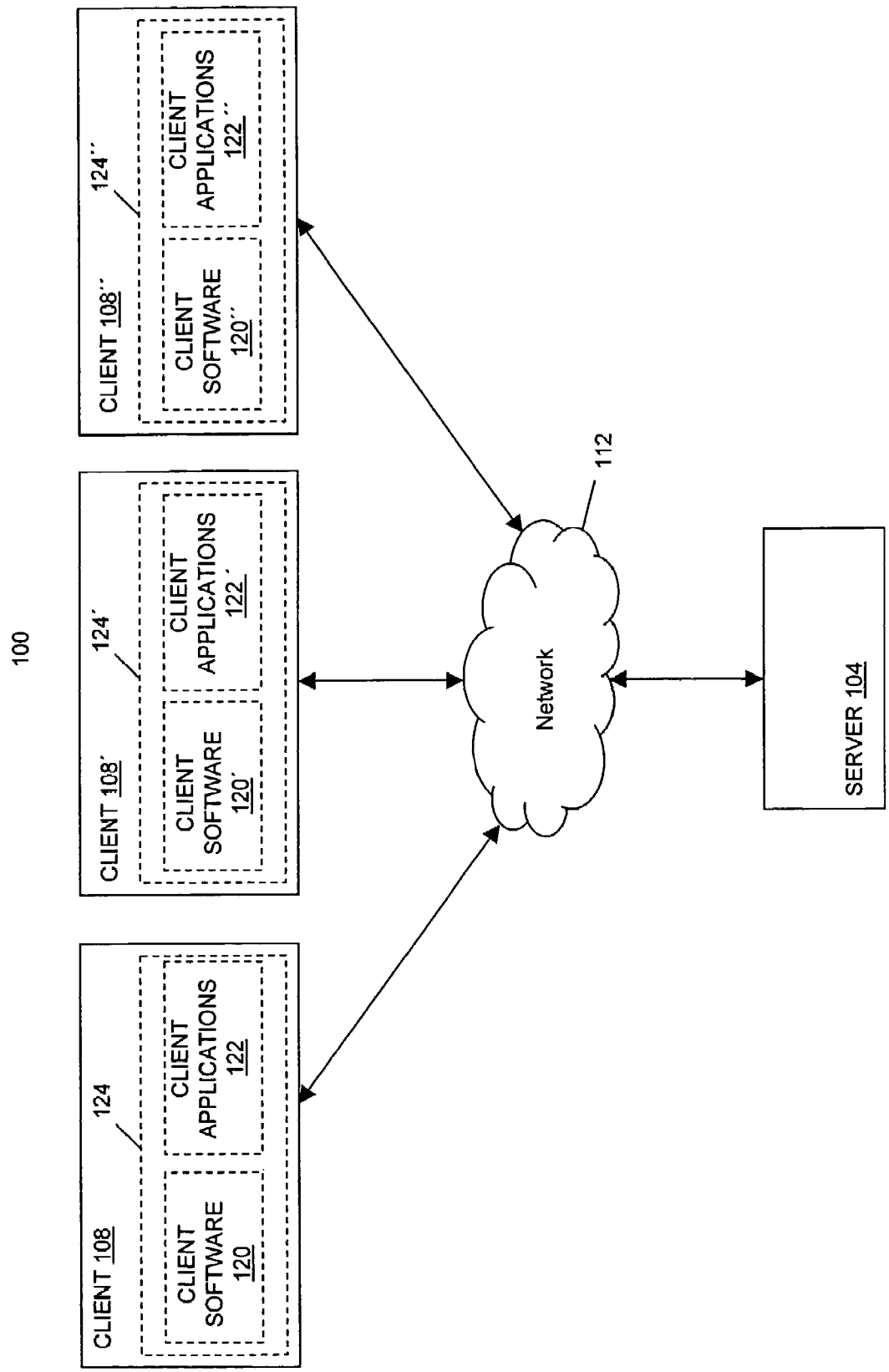
FIG. 1 is a block diagram of an embodiment of a system according to the invention.

Referring to FIG. 1, in one embodiment, an information storage and retrieval system 100 includes at least one server 104, and at least one client 108, 108', 108", generally 108. As shown, the information storage and retrieval system 100 includes three clients 108, 108', 108", but this is only for exemplary purposes, and it is intended that there can be any number of clients 108. The client 108 is preferably implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 108 could also be implemented on such hardware as a smart or dumb terminal, network computer, personal data assistant, wireless device, information appliance, workstation, mini-computer, mainframe computer, or other computing device that is operated as a general purpose computer or a special purpose hardware device solely used for serving as a client 108 in the information storage and retrieval system 100.

Generally, clients 108 are operated by users of the system to receive, review, store and retrieve data regarding investment opportunities. In various embodiments, the client computer 108 includes client applications 122, client software 120, or both. One example of a client application 122 is a web browser application that allows the client 108 to request a web page (e.g. from the server 104) with a web page request. An example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client 108 manually requests a web page from the server 104. Alternatively, the client 108 automatically makes requests with the web browser. Examples of commercially available web browser software are INTERNET EXPLORER, offered by Microsoft Corporation of Redmond, Wash., and NETSCAPE NAVIGATOR, offered by AOL/Time Warner of Mountain View, Calif.

In some embodiments, the client 108 also includes client software 120. The client software 120 provides functionality to the client 108 that allows a user to request and receive data using the methods described herein. The client software 120 may be implemented in various forms. For example, it may be in the form of a Java applet that is downloaded to the client 108 and runs in conjunction with one or more client applications 122. The client software may be a standalone application written in C/C++, C#, Java or other appropriate client programming language. The client software 120 may be in the form of an application plug-in written in Visual Basic, C/C++, or C# that operates within a client application 122. Further, the client software 120 may be in the form of a standalone application, implemented in a multi-platform language such as Java, in a .Net Framework language such as C#, or in native processor executable code. In one embodiment, if executing on the client 108, the client software 120 opens a network connection to the server 104 over the communications network 112 and communicates via that connection to the server 104. The client software 120 and the web browser may be part of a single client-server interface 124; for example, the client software can be implemented as a "plug-in" to the web browser. The web browser is but one possible example of a client application, and others may include word processors, spreadsheets, operating system extensions, email clients, as well as others.

A communications network 112 connects the client 108 with the server 104. The communication may take place via any media such as standard telephone lines, LAN or WAN links (e.g., T1, T3, 56 kb, X.25), broadband connections (ISDN, Frame Relay, ATM), wireless links, and so on. Preferably, the network 112 can carry TCP/IP protocol communications, and HTTP/HTTPS requests made by the web browser and the connection between the client software 120 and the server 104 can be communicated over such TCP/IP networks. The type of network is not limited, however, and any suitable network may be used. Typical examples of networks that can serve as the communications network 112 include a wireless or wired ethernet-based intranet, a local or wide-area network (LAN or WAN), and/or the global communications network known as the Internet, which may accommodate many different communications media and protocols.

An administrator operates a central server 104, which interacts with clients 108. The server 104 is preferably implemented on one or more server class computers that have sufficient memory, data storage, and processing power and that run a server class operating system (e.g. SUN Solaris, GNU/Linux, MICROSOFT WINDOWS 2000, and later versions, or other such operating system). Other types of system hardware and software than that described here could also be used, depending on the capacity of the device and the number of users and the amount of data received. For example, the server 104 may be part of a server farm or server network, which is a logical group of one or more servers. As another example, there could be multiple servers 104 that may be associated or connected with each other, or multiple servers could operate independently, but with shared data. As is typical in large-scale systems, application software could be implemented in components, with different components running on different server computers, on the same server, or some combination.

Figure 2:
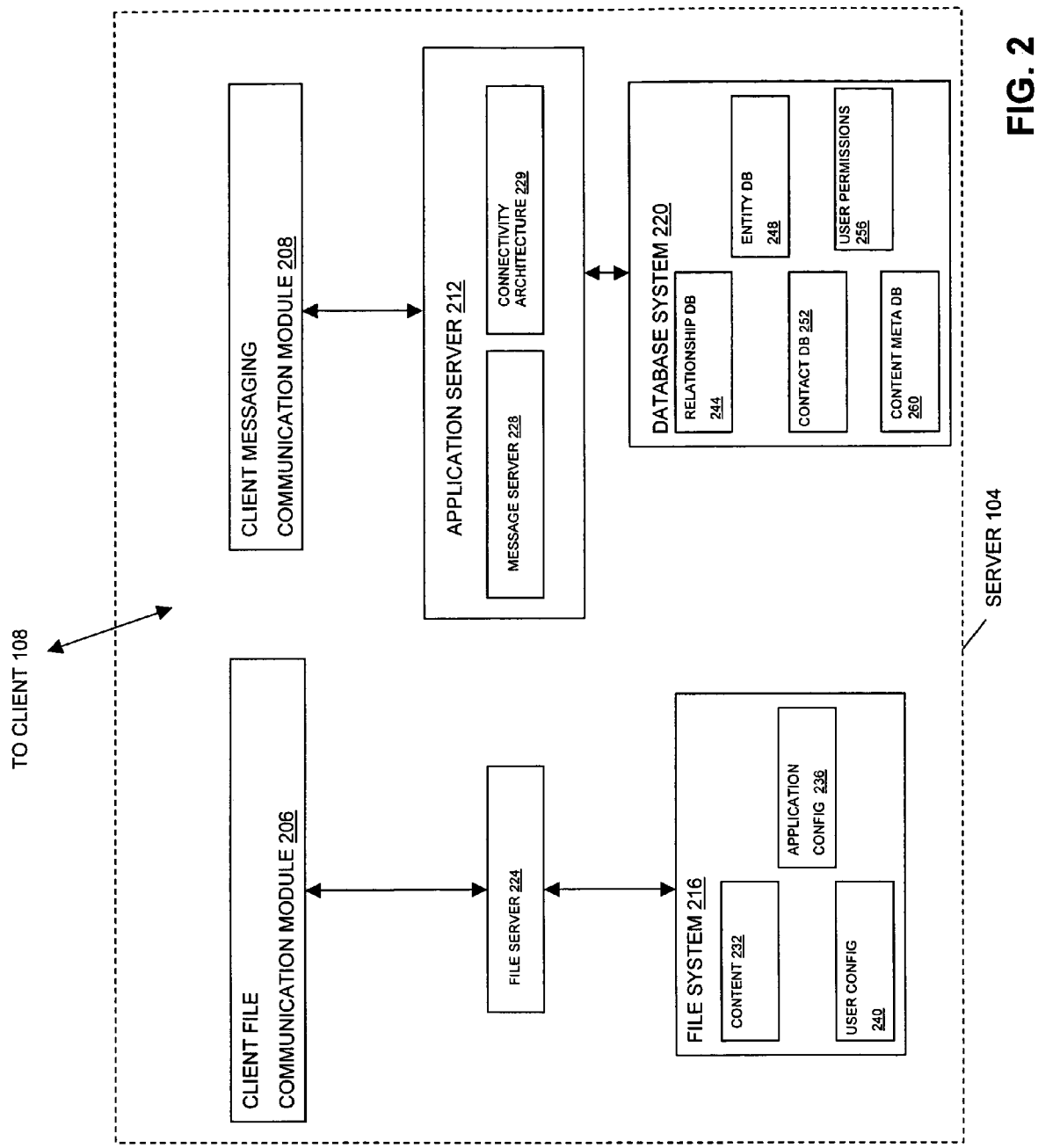
FIG. 2 is a block diagram of an embodiment of a server in the system of FIG. 1.

Referring to FIG. 2, in one embodiment, a server 104 includes a client file communication module 206 that is the interface for communication with clients 108 involving the transfer of files. In some instances, files may be transferred from the client 108 to the server 104, from the server 104 to the client 108, or both. The client communication module 206 can be implemented as software running on one or more servers, or may be implemented as a stand-alone server. In some embodiments, the client file communication module 206 can provide an interface both to client software 120 and to client applications 122, so that, for example, a user can access investment performance information through a web browser, a word processing application, or to review other data, and so on, while the client software 120 can be used for requesting and receiving additional information, or for defining parameters of the system. The interface to each of the client software 120 and the client applications 122 can be implemented separately or in combination. In other embodiments, the client file communication module 206 can also communicate using other protocols or mechanisms.

In another embodiment, the server 104 includes a client messaging communication module 208 that is the interface for communication with clients 108 involving HTTP/S requests and responses, Java messages, SMTP messages, POP3 messages, instant messages, RSS feeds, as well as other electronic messages. In some instances, messages may be transferred from the client 108 to the server 104, from the server 104 to the client 108, or both. The client messaging communication module 208 can be implemented as software running on one or more servers, or may be implemented as a stand-alone server. In some embodiments, the client messaging communication module 208 can provide an interface both to client software 120 and to client applications 122, so that, for example, a user can send and receive e-mail, instant messages, and so on, while the client software 120 can be used for requesting and receiving additional information, or for defining parameters of the system. The interface to each of the client software 120 and the client applications 122 can be implemented separately or in combination. In other embodiments, the client messaging communication module 208 can also communicate using other protocols or mechanisms.

The client messaging communication module 208 communicates with the application server 212, which provides the main programming logic for the operation of the system. In one embodiment, the application server 212 is implemented as one or more application programs running on a server class computer, which may be the same or different computer as the client file communication module 206 or the client messaging communication module 208. The application server 212 receives requests for data stored in a database (such as an email, the historical performance of an investment vehicle, etc.) from users via the client messaging communication module 208, provides updated data to the client 108, and enforces system, application, and user level rules.

The server 104 also includes a database system 220, which stores data related to the investment opportunities, user permissions, industry data, and the like in one or more databases. For instance, the database server 220 may store information relating to entities defined by the users of the system, relationships among the entities, stored content, user information, server availability, and web traffic information. The database server 220 may also contain separate databases for relationships 244, entities 248, contacts of the users 252, user permissions and security information 256, content metadata 260, and others. The database server 220 provides data to the application server 212. An example of the database server 220 is the MySQL Database Server by MySQL AB of Uppsala, Sweden, the PostgreSQL Database Server by the PostgreSQL Global Development Group of Berkeley, Calif., or the ORACLE Database Server offered by ORACLE Corp. of Redwood Shores, Calif.

The server 104 also includes a file server 224 and a file storage system 216, which stores static data files 232 related to investment opportunities such as web pages, word processing documents, spreadsheets, PDF files, and others. The file server 224 receives requests for static data files from the client 108 via the client file communications module 206, transmits the request to the file storage system 216, and manages the status of the file once it is sent to the client 108. The file storage system 216 also stores application configuration information 236, such as server names, communication protocols, directory structures, and other aspects of the application that may be customized at the application, server, or system level. The file server 216 can also store user configuration information 240 such as screen preferences, menu options, security and administrative information, and other functional aspects of the application that may be customized from user to user. In one embodiment, the file storage system 216 stores only data files, while file metadata such as the file location, the author, the creation date, file revision history and other metadata are stored in the content metadata DB 260.

Figure 3:
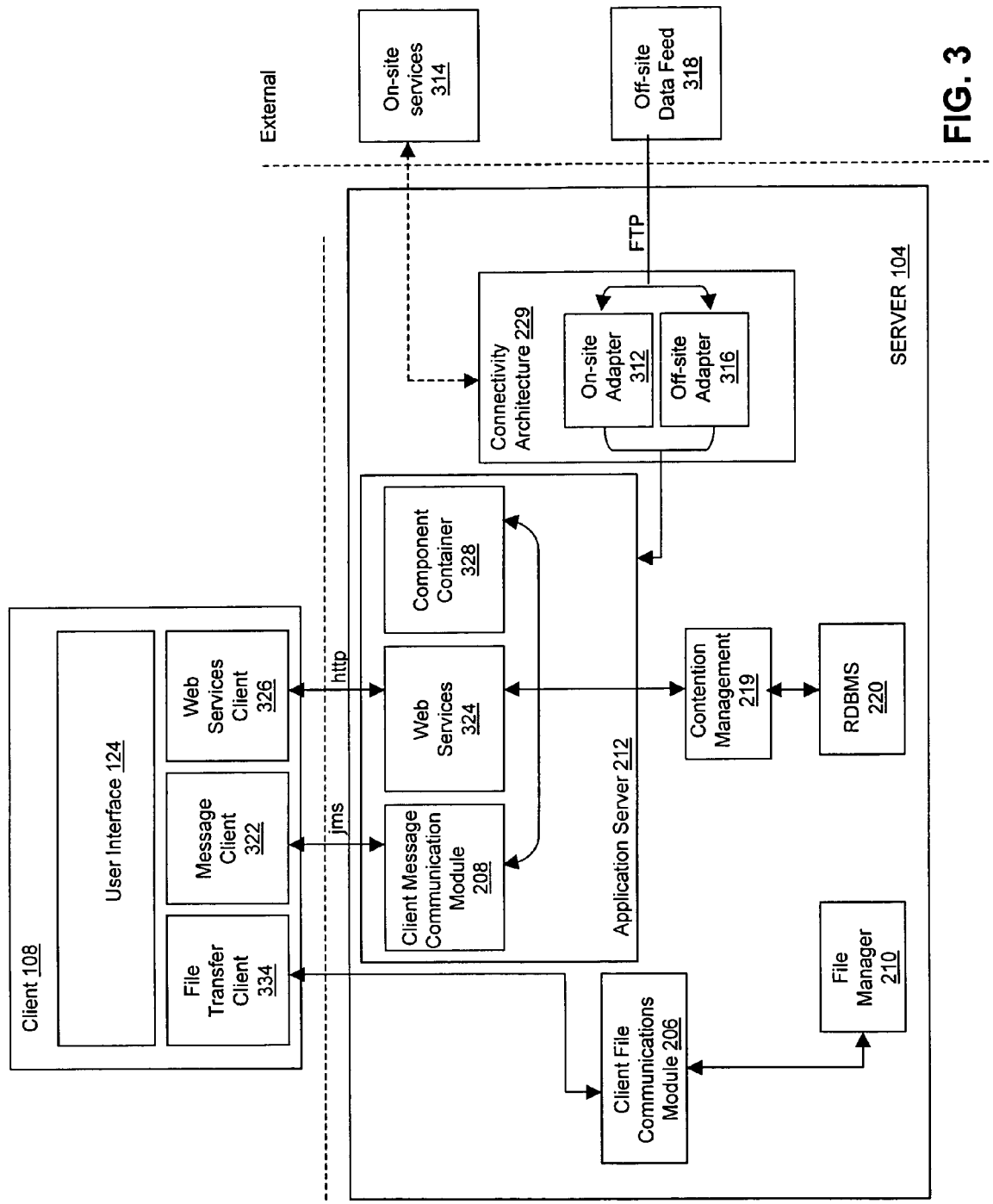
FIG. 3 is a more detailed block diagram of an embodiment of the server of FIG. 2.

Referring to FIG. 3, in one embodiment, the client 108 includes a message client module 322, a web services client 326, and file transfer client module 334. The message client module 322 receives messages via the Java messaging service or other similar communications service from the application server 212 via the client messaging communications module 208. Upon receiving a message from the client messaging communications module 208, the message client 322 facilitates the display of the message on the user interface 124. The web services client module 326 facilitates receiving data from the application server 212 via a web services server module 324 such as the Apache Axis Web Services software via HTTP or some similar protocol. Both the web services module 324 and the client message communication module 208 publish data, for example, in XML format such that data may be automatically received by the web services client 326 and displayed on the user interface 124 without user interaction. The file transfer client 334 may request and receive files from the file server 224 using a protocol such as the File Transfer Protocol (FTP), WebDAV or variant thereof via the client file communications module 206. The server 104 may also include a contention resolution module 219 for managing user permissions and data privacy and contention issues when the application server 212 requests or updates data in the database system 220.

In some embodiments, the server 104 includes connectivity architecture 229 comprising adapters for receiving, filtering, and formatting data feeds from sources external to the system. In one embodiment, an on-site adapter 312 receives data from on-site services 314, via the Java messaging service or other similar messaging service. A second, off-site adapter 316 can receive data from off-site data providers 318 such as FirstCall available from Thompson Financial and Street Events available from CCBN via a standard File Transfer Protocol (FTP) or other file transfer protocols or RSS feeds. In some embodiments, different adapters may be employed for different data sources.

The server 104 may also include, in some embodiments, a component container module 328 such as the Enterprise Java Beans container for storing application components which may be used by the application server 212.

Figure 4:
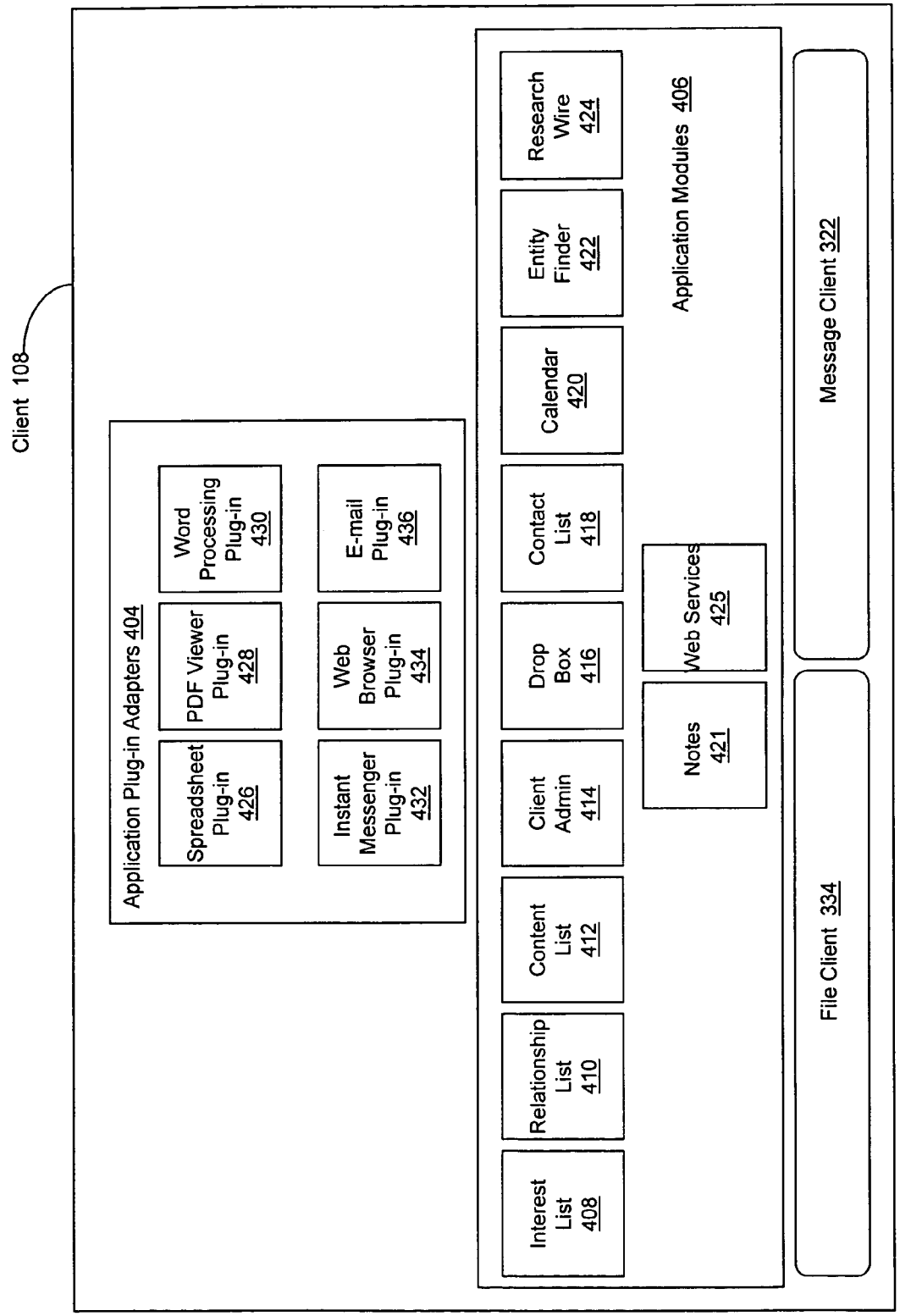
FIG. 4 is a block diagram of an embodiment of a client in the system of FIG. 1.

Referring to FIG. 4, in one embodiment, the client 108 includes application plug-in adapters 404 and application function modules 406. The application plug-in adapters 404 ("plug-ins") facilitate the capture of data, files, content, and other information presented to the user in other commercially available or custom developed software applications that reside on the client 108 or the server 104. Exemplary applications include, but are not limited to, spreadsheet application plug-ins 426 for software such as Microsoft Excel; postscript data format (PDF) viewer application plug-ins 428 for software such as Adobe Acrobat; word processing application plug-ins 430 for software such as Microsoft Word; instant messenger application plug-ins 432 for software such as AOL's Instant Messenger; web browser application plug-ins 434 for software such as Netscape Navigator or Microsoft Explorer; and email application plug-ins 436 for software such as Microsoft Outlook, Lotus Notes, Qualcomm Eudora; as well as adapters for other client-resident applications from which information may be captured. In some embodiments, the plug-in adapters 404 may facilitate capturing information from applications that reside on the server, 104.

In some embodiments, the plug-ins 404 are initiated by selections from a menu or buttons on a toolbar within a client application 122, and in some cases may not require the client software 120 to be operational or to be invoked. For example, a user may receive an electronic mail message with important information regarding a particular entity. In such cases where the toolbar for the user's electronic mail client application has been updated with the email plug-in 436, the user only needs to highlight the desired message (or portions thereof) and click or select the plug-in button. The email plug-in 436 captures the information, and sends it to the file system 216 via the file server 224. Similarly, data being viewed on a World Wide Web content page, as part of a newswire, or from other publicly or privately published documents may be captured and stored in the system using plug-ins adapted for the particular client application 122 used to receive and view the information.

The application function modules 406 facilitate the review, creation, and manipulation of various elements of the system such as information items, personal display and security settings, application defaults, etc. For example, some embodiments may include an interest list module 408 for maintaining one or more lists of topics that may be of particular interest to a user or group of users. Examples of topics that may be included in such a list include companies, financial markets such as the NASDAQ or NYSE, investment vehicles such as bonds or equities, geographic regions such as Japan or the European Union, industries such as computers or automobiles, political issues such as unions or healthcare reform, and the like.

Some embodiments can include an entity finder module 422 for finding or creating an entity to which information may be attributed. For example, a user may be interested in the computer hardware industry, and create entities for the companies that manufacture and sell computer hardware. In some embodiments, the list of entities is pre-populated with a list of companies based on membership in an industry group such as those companies that are listed on a particular stock exchange. In some embodiments, the list of entries can be created by the users of the system.

Some embodiments can include a relationship list module 410 for reviewing and defining relationships between entities. For example, if company A supplies raw materials such as steel or computer chips to company B that company B uses to make its products, a relationship may be defined indicating that company A supplies goods or services to company B. Similar relationships may be created for companies that are competitors, partners, subsidiaries, as well as other business and legal relationships.

Some embodiments can include additional application modules such as a content list module 412 for reviewing information pertaining to one or more entities; a client administration module 414 for facilitating the customization of the user interface 124 for individual users; a drop box module 416 which allows users to easily associate a file or partial content from a file with a particular entity; a contact list module 418 for maintaining information about people from whom one or more users of the system receive information; a calendar module 420 for listing dated events pertaining to entities such as earnings announcements or product launches; a notes module 421 for allowing the creation, storage, and sharing of user-created notes; a research wire module 424 for reviewing information such as research reports published by financial analysts; and a client web services module 425 to facilitate the synchronous request/response of data on the server. In addition, an asynchronous interface composed of a messaging client and a messaging server, for example a Java Messaging Service client/server pair, facilitate the asynchronous update of data residing on the client 108 as it is updated on the server 104 and exposed using the web services module 324 residing on the server 104.

Referring to FIG. 5, in one embodiment, a set of rules 505 govern the creation of the entities 510, the type of entities 515 that can be created, the creation of the relationships 520, the types of relationships 525 that can be created, and which relationships may be used to link entities of a given type. In one embodiment, the rules 505 can describe the entity types 515 that can be created. For example, the rules 505 can specify the entity types 515 as "corporate" entities representing companies, "index" entities representing groups of publicly held companies used to calculate a market statistic, "industry" entities representing a specific area of commerce, and "topic" entities representing subjects that may impact other entities. In another embodiment, the rules 505 can specify the relationship types 525 that can be created. For example, the rules 505 can specify the relationship types 525 as the relationship types listed in Table 1 below.

TABLE 1

| Relationship Types |
|---|
| Relationship Type |
| Buys from |
| Competes with |
| Distributes for |
| Distributes through |
| Has subsidiaries |
| Is a subsidiary of |
| Is in index |
| Is in industry |
| Is supplied by |
| Partners with |
| Sells to |
| Has index member |
| Has industry member |
| Influences |
| Relates to |

In one embodiment, the rules 505 govern the relationships that one entity type may have with other entity types. For example, a corporate entity may have different relationships with other corporate entities than it would have with an index entity or a topic entity. Table 2 below contains one possible listing of relationship types and the rules associated with how they can be used to relate different entity types. It should be noted, however, that these exemplary relationships represent one particular set of relationships that may be implemented in a specific embodiment of the invention. Additional relationships used to describe the associations of entities with each other may be obvious to those skilled in the art of analyzing the performance of a company, an industry, or other similar entity.

TABLE 2

Relationship Rules

| Entity Type | Relationship Type | Allowable Related Entities |
|---|---|---|
| Corporate | Buys from | Corporate |
| Corporate | Competes with | Corporate |
| Corporate | Distributes for | Corporate |
| Corporate | Distributes through | Corporate |
| Corporate | Has subsidiaries | Corporate |
| Corporate | Is a subsidiary of | Corporate |
| Corporate | Is in index | Index |
| Corporate | Is in industry | Industry |
| Corporate | Is supplied by | Corporate |
| Corporate | Partners with | Corporate |
| Corporate | Relates to | Topic |
| Corporate | Sells to | Corporate |
| Index | Has index member | Corporate |
| Index | Relates to | Topic |
| Industry | Distributes through | Industry |
| Industry | Has industry member | Corporate |
| Industry | Is supplied by | Industry |
| Industry | Relates to | Topic |
| Topic | Influences | Corporate |
| Topic | Relates to | Topic |

For example, if a user created an entity to represent a corporation which is listed on a particular stock exchange and that sells its products to another corporation, the rules 505 may permit the user to create an "is in index" relationship to an entity of type "index" and a "distributes for" relationship to an entity of type "corporate." In addition, the user may create an entity for an industry such as "healthcare," and a relationship to another industry such as "insurance." However, to maintain the integrity of the system, the rules 505 may prohibit certain relationships based on the entity and relationship types—e.g. the rules 505 may prohibit an "is in index" relationship between an industry entity (healthcare) and an index entity (NYSE) because industries are not listed on stock exchanges. Unlike systems with static lists of entities, a system that allows users to create, modify, and delete entities and the relationships between them, and to have these changes distributed across multiple users in real time provides a greater degree of flexibility to analysts. Such a system can focus on those industries or aspects of investment opportunities that are important to a given organization, maintain knowledge when people leave, and evolve as industries, companies, and investment opportunities grow and change.

In some embodiments, the relationships that connect the entities propagate across multiple entities—that is the same relationship linking a first entity to a second entity also can be the same type of relationship that links the second entity to a third, and so on. By providing such a feature, both direct relationships (entities connected by one or more relationships) as well as indirect relationships (entities separated by one or more intermediate entities, but otherwise reachable through multiple "hops," thus creating a chain of relationships) can be modeled. Two possible categories of propagating relationships include hierarchical and influential. In some cases, the relationships are reciprocal, i.e. a certain relationship type from entity A to entity B by definition implies a related or "reciprocal" relationship from B to A. For example, a series of propagating hierarchical relationships may be used to describe a large industry, a sub-industry, and a further specialized market within the sub-industry using the "has industry member" relationship and its reciprocal relationship "is in industry" among the hierarchical industry entities.

As an illustration, the automobile industry may have a "has industry member" relationship to a "truck industry" entity, which in turn may have the same "has industry member" relationship with a "light truck industry" entity. Moving back from "light truck industry" the relationships would indicate that the subordinate entity is related to the parent industry by an "is in industry" relationship. In this example, the "light truck industry" has an "is in industry" relationship with the "truck industry." Similar hierarchies can be represented for indices, for example, where a company's stock is a component of a market index. For example, an analyst that follows a market index such as the NASDAQ index may be interested in information items associated with companies such as Microsoft, Cisco, and others. By creating an "is in index" relationship from a Microsoft entity to a NASDAQ entity, and a reciprocal "has member" relationship from NASDAQ to Microsoft, results of requests for information associated with NASDAQ can also include information associated with Microsoft. Likewise, a particular equity or other investment vehicle can be directly or indirectly related to a mutual fund, hedge fund, or other actively or passively managed investment portfolio. By creating hierarchical relationships that span multiple entities, information items that provide valuable information to an analyst but that are associated with entities that are three or four relationships removed from the focus entity can still be retrieved.

Similarly, an influential relationship type describes relationships among entities that can influence each other, and is also reciprocal. Where a first entity influences a second entity, and an "influences" relationship connects the two from the first entity to the second, a reciprocal "is influenced by" relationship connects the same two entities in the opposite direction—e.g., from the second entity to the first. For example, a series of influential relationships can be used to connect entities representing political issues, world leaders, legal issues, and geographic regions: in a particular example, an entity representing "Bush Administration" has an influential relationship with an entity representing "Energy Policy" which in turn has an influential relationship with a third entity representing "Middle East Policy." Like the hierarchical relationships, the reciprocal nature of the influential relationships provides bi-directional relationships among the entities. Using the above example, where the entity "Bush Administration" is related to the entity "Energy Policy" through an "influences" relationship, the reciprocal "is influenced by" relationship can describe the relationship from the "Energy Policy" entity to the "Bush Administration" entity. Furthermore, because some entities have stronger influences on other entities, the relationships may be further annotated with an "influence factor." For example, an analyst may believe that the Bush Administration is highly influential on a Middle East Policy entity, but in contrast, only slightly influential on a "Tort Reform" entity. The ability to traverse across multiple relationships and include many entities in a set of entities that are potentially influential on a particular entity of interest can result in the retrieval of a larger collection of information items, including those that may not have been associated with the entity of interest, but valuable nonetheless. This large collection provides an analyst an exceptionally broad view of a market, an industry, and world events, which may in turn lead to better decisions regarding investments.

Figure 5A:
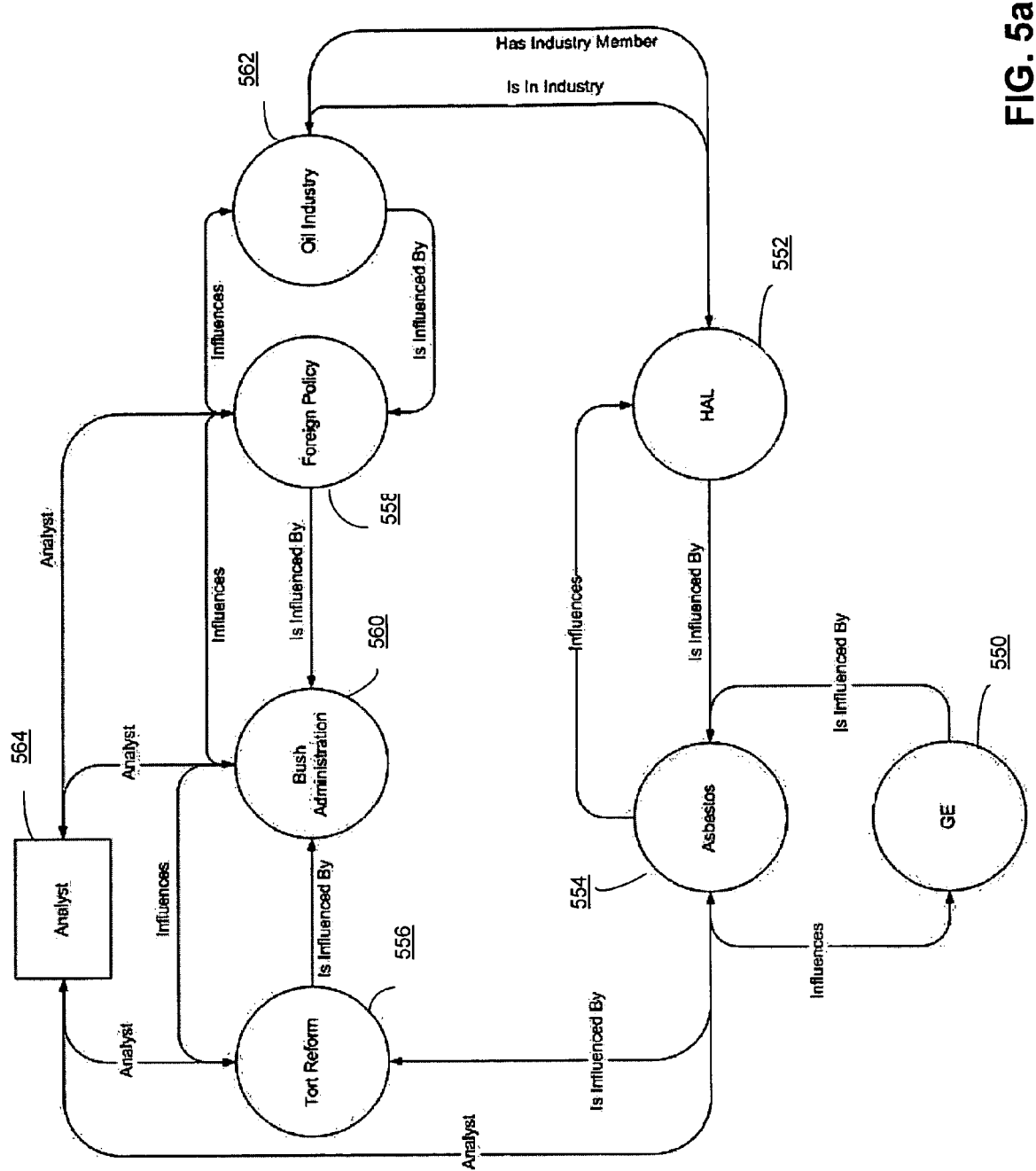
FIG. 5a is a block diagram of an embodiment of a system according to the invention.

Referring to FIG. 5A, in one embodiment, an exemplary entity-relationship network facilitates the identification of a set of entities that are related through one or more relationships. The entity-relationship network includes a set of entities, which can include companies such as GE 550 and Haliburton 552, business topics that may influence the financial or operational performance of the company or market such as asbestos 554 and tort reform 556, political topics such as the Bush Administration 560 and foreign policy 558, and industries such as the oil industry 562. Entities can also include individuals such as analysts 564 that comment on or cover certain companies, industries, or other topics. As an example, a user of the system may be researching a potential investment in Haliburton. By focusing on the Haliburton entity 552, the information items associated with the Haliburton entity 552 will be retrieved from the database and returned to the user. In addition, if so configured, the information items associated with those entities that are direct neighbors of the Haliburton entity 552—e.g. the asbestos entity 554 and the oil industry entity 562 (because the asbestos entity 554 "influences" Haliburton and Haliburton has an "is in industry" relationship to the oil industry entity 562. However, if the user wishes to expand the scope of information being retrieved by the system even further, he can instruct the system to retrieve information items that are associated with entities that are indirectly related to the Haliburton entity 552 through multiple relationships.

As described above, entities that are directly related to the entity of interest include those entities that can be reached by traversing only one relationship in the network. In one exemplary embodiment, the system retrieves information items that are associated with entities that are connected, either directly or indirectly, to the entity of interest through both direct and indirect relationships and that have the same relationship type and direction linking previously identified entities. For example, a first entity may be influenced by a second entity, and thus the system travels across an "influenced by" relationship from the first entity to the second. The second entity may in turn be influenced by a third entity, and the system can travel across a second "influenced by" relationship from the second entity to the third. In this manner, entities that are separated from an entity of interest by more than one relationship can be included in the subset of entities for which information items are retrieved. The number of relationships needed to get from the entity of interest to another entity sometimes referred to as the "degree of separation" or "levels of indirection," (one for direct relationships, more than one for indirect relationships), can vary, and in some cases may be limited by the user.

In the example shown, the system identifies the relationship between the Haliburton entity 552 and the asbestos entity 554. In this example, the relationship is a direct "is influenced by" relationship, and therefore the system determines if the asbestos entity 554 "is influenced by" any other entities not yet identified. Referring to FIG. 5a, an "is influenced by" relationship connects the Tort Reform entity 556 to the asbestos entity 554, and further connects the Bush Administration entity 560 to the tort reform entity 556. Similarly, an "is influenced by" relationship connects the Foreign policy entity 558 to the oil industry entity 562. As a result, expanding the search for information items that may be related, but not necessarily directly associated with, the Haliburton entity 552, increases the set of entities of interest from three (Haliburton 552, asbestos 554, and oil industry 562) to six (Haliburton 552, asbestos 554, and oil industry 562, plus tort reform 556, Bush Administration 560, and foreign policy 558). By following the relationships having the same type and direction, influences on entities of interest can be traced through numerous intervening entities to the "root cause" entity, and information items associated with that entity can be reviewed for information that may be pertinent to investment decisions regarding the entity of interest.

Figure 5B:
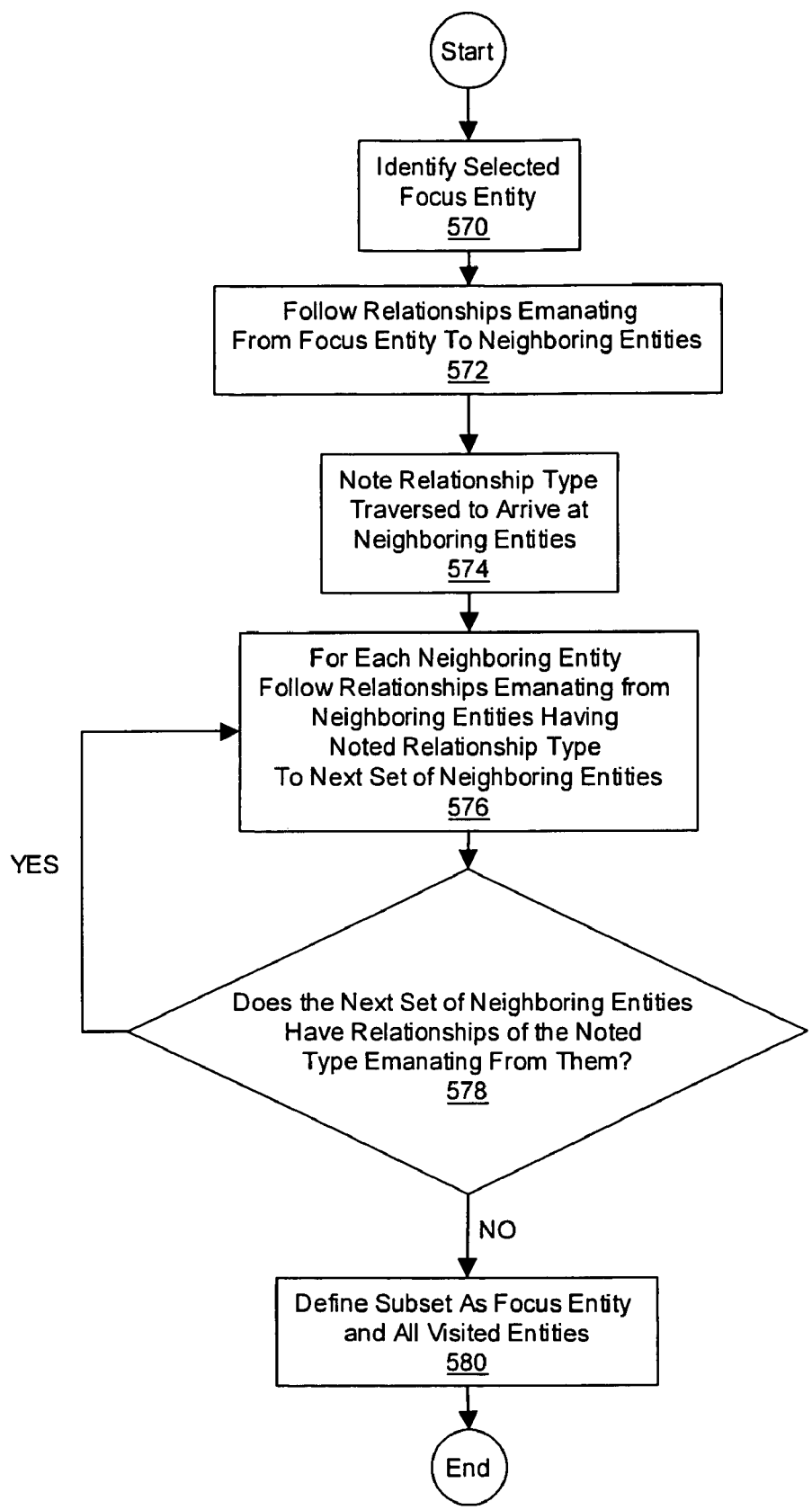
FIG. 5b is a flowchart of an embodiment according to the invention.

More generally, FIG. 5b illustrates one example of a method for determining the entities to include in the subset of entities for which information items are to be retrieved. Initially, a focus identity is selected (STEP 570). The focus entity generally indicates the company, index, topic, or other subject area of interest being researched. To build the initial network of entities and relationships, relationships that indicate another entity may influence the focus entity or that indicate the focus entity is a member of a larger group are followed to the neighboring entities (STEP 572). Each neighboring entity is then treated as a focus entity, and any relationships that are of the same type (i.e., propagating hierarchical or influential relationships) are followed to the next set of neighboring entities (STEP 576). The system determines if there are any remaining relationships that have not be followed (DECISION STEP 578) and if so, repeats STEP 576 until there are no additional entities that can be reached. The set of entities is then defined as the subset of entities (STEP 580) for which information items will be returned.

In some cases, numerous relationships may be used to govern travel from the focus entity to another entity, and, as described above, certain relationships may be "stronger" i.e., the impact that one entity has on another may be much greater than others. For example, only relationships of a certain strength might be followed. In other cases, where an entity represents a company with diverse businesses and product offerings, a stronger "is in industry" relationship may be desired when describing the company's relationship to a core business, as opposed to a business that they are only tangentially related to. In addition, the user may indicate that the traversal process terminate after some number of iterations, or that entities that require the traversal of some number of relationships (e.g., more than four) are not included. In other cases, an analyst may allow the system to traverse the entire network, but only follow those relationships that have a high strength indicator. In some cases, a combination of degree or separation and relationship strength may be used to determine the subset of entities. As one such non-limiting example, a user may indicate that the set of identified entities includes all entities that are separated from the focus entity by three or fewer intermediate entities regardless of relationship strength, and subsequently follow only strong relationships to entities that are four or more degrees of separation from the focus entity. In some instances, users may instruct the system to only follow a subset of the relationships emanating from the focus entity. For example, where one entity has a large number of immediate direct relationships, following every relationship may result in an unmanageable result set. By allowing the user to limit the paths that are followed to some subset of paths (i.e., one or two paths, for example, up to the total number of direct relationships) the set or retrieved information items can be kept to a manageable number. These features provide the user with added flexibility with regard to the volume of information received, and the perceived relevance of the derivative information as it becomes more distant from the focus entity.

Figure 6:
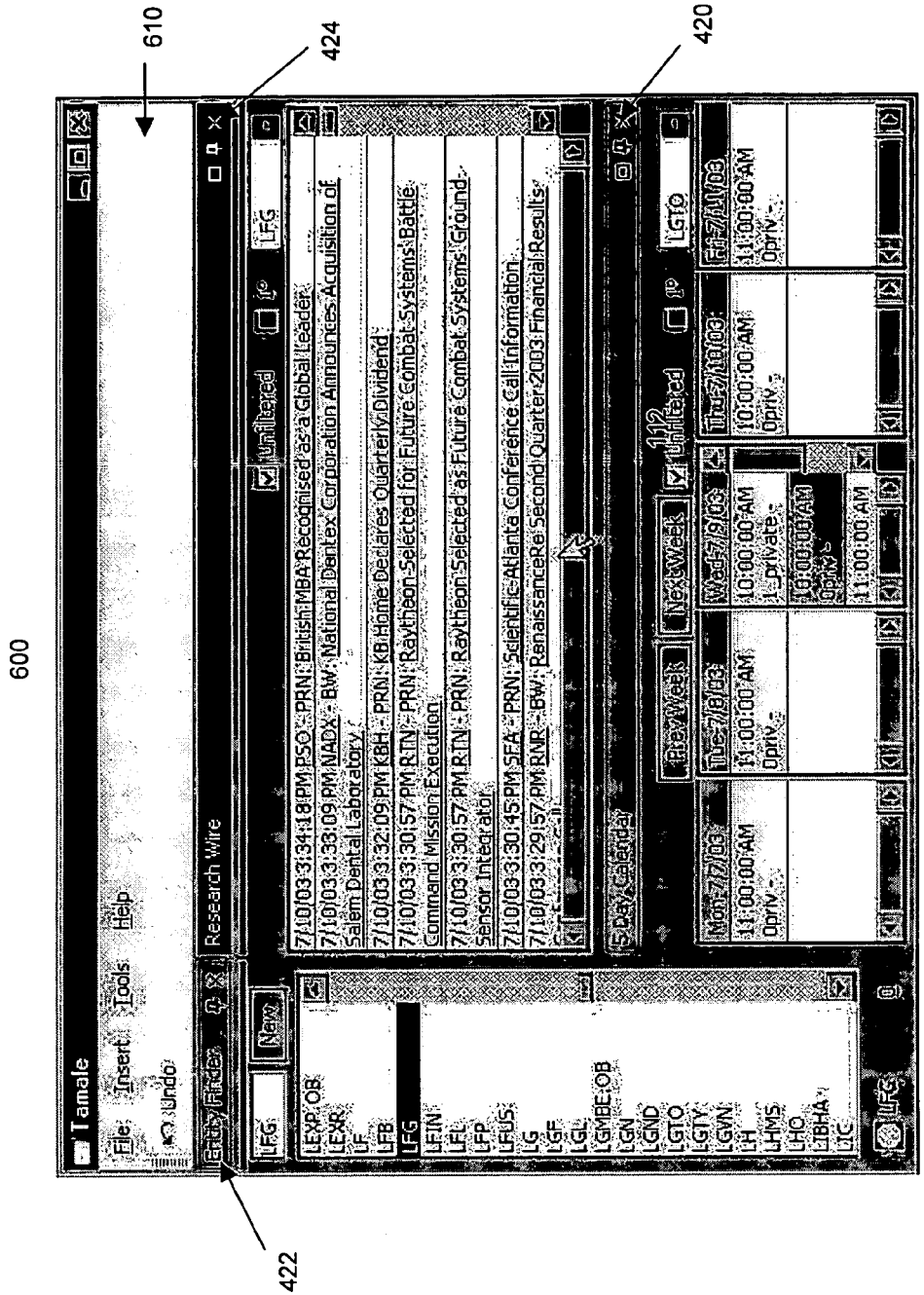
FIG. 6 is a screen display of the work area in an embodiment of the client of FIG. 4.

Referring to FIG. 6, in one exemplary embodiment, the system provides a work area 600 on the client 108. The work area 600 can include one or more of the application function modules 406 described above. For example, the work area 600 can include a toolbar 610 allowing users to access functions of the system through a system of menus. The work area can also include the entity finder module 422, the research wire module 424, and the calendar module 420. In some embodiments, the application function modules can be positioned on the user interface 124 at different locations as determined by the user. For example, the entity finder module 620 can be positioned along the left side of the screen, with the research wire module 630 and calendar module 530 to the right of the entity finder module 620. In some embodiments, the positions of each module, both relative to the user interface 124 and to each other may be saved to the user configuration file system 240 using the client administration module 412 such that each time an individual user access the system, the layout of the work area 600 is consistent. In some embodiments, the configurations of the work area 600 may be saved at the application level, group level, or on an individual user basis. By allowing users to customize and maintain a personal work area 600, the system facilitates the varied usage styles of different people—i.e. some analysts may prefer to see all of the information arranged on the client 108, while other analysts may prefer to see only selected items such as the calendar module 420.

Figure 7:
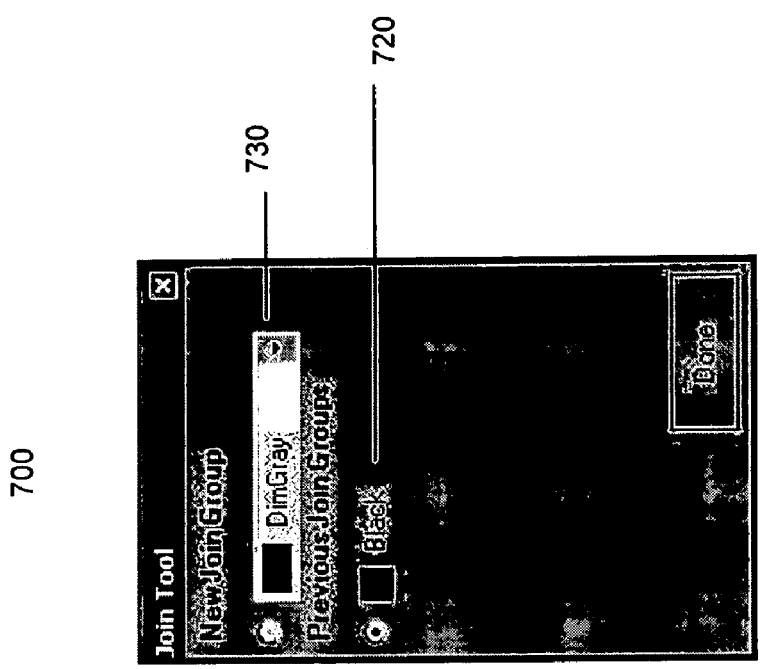
FIG. 7 is a screen display of the join tool in an embodiment of the client of FIG. 4.

Referring to FIG. 7, in one embodiment, a join tool 700 may be used to group application function modules 406 together such that when a user selects data to be presented in one module the data presented in the joined application function modules 406 is updated. In one embodiment, the join tool 700 can provide instructions to the user on how to join application function modules 406. For example, if the entity finder module 422 and the research wire module 424 were grouped using the join tool 700, and the user changed the selected entity in the entity finder module 422 from General Electric to IBM, the data presented in the research wire module 424 would be updated with data pertaining to IBM.

The join tool 700 may also provide multiple join groups. For example, a user may select certain application function modules 406 to be part of a group and select from a drop down box 730 the color to be associated with the group and displayed along the band at the top of the application function modules 406 in each group. By identifying each group using the colors 720, a user may easily identify those modules grouped together while looking at the work area 600, which may contain numerous application function modules 406, some of which may be grouped and others which may not. This provides the user with a work area 600 that is synchronized across application function modules 406, to the extent desired. The join tool 700 also provides a listing of previously defined groups, and the colors associated with each group 720.

Referring to FIGS. 8a and 8b, in one embodiment, the entity finder module 422 includes a display window 810, an entity list 820, and a define new entity button 830 which is used to create new entities using the create new entity screen 840. The display window 810 provides the user with the name of the current entity about which information is being displayed in other application function modules 406 that are grouped with the entity finder module 422. The entity list 820 provides a listing of the entities about which information may be retrieved from the system. In some embodiments, the entity list 820 may be created by a central administrator, while in other embodiments the entity list may be created by individual users of the system. In some embodiments, the entities listed in the entity list 820 may be restricted on a global level, group level, or an individual level. For example, if an individual analyst is responsible for the automobile industry, the entity list 820 may be limited to automobile manufacturers, their suppliers, and other topics related to the automobile industry such as oil futures, labor unions, and interest rates.

Referring to FIG. 8b, the create new entity screen 840 includes an entity type data window 850, an entity name data window 860, a entity short name data window 870, and an entity alias data window 875. In some embodiments, the values available to a user in the entity type data window 850 may be limited to values defined by a central administrator and stored in the database 220, and in other embodiments the values may be user defined and stored in the user configuration files 240. For example, to facilitate certain reporting or other functions, the list of entity types may be limited to corporations, indices (such as NASDQ or NIKKEI), industries (such as automotive or computer hardware), and topics (such as asbestos, war, or the environment). In one embodiment, the topic entities may be either public or private. Public entities may be used throughout the application by multiple users of the system, while private topics may be limited to one individual user or a particular group of users.

In one embodiment, the entities may be predefined, with periodic updates available from vendors specializing in how entities are related and influence each other. For example, a vendor can supply a pre-populated database or flat file containing lists of corporate entities listed on the NYSE and NASDQ, their parent and subsidiaries, and general industries. The same vendor, or in one embodiment another vendor, may also supply the relationships among the entities. This data can be imported into the system. In other embodiments, the data files can be appended or overwritten with files updated based on the passage of time, and such events as large mergers, delistings, bankruptcies, or initial public offerings.

Referring to FIG. 8c, in one embodiment, the create note details screen 880 includes a source field 855, a sentiment field 890, and a note text field 895. The note details screen 880 allows a user to create free form text notes about a topic. The source field 885 identifies the source of the note, thus allowing users to see who created the note 895. By providing this information, the system allows users to filter notes based on the source of the note 895, or give greater weight to a note based on its author. The sentiment field 890 allows the author of the note 895 to provide an indication of whether the note 895 reflects positively or negatively on a topic or entity. For example, a first user may only want to see positive notes from a second user, but wish to see all notes from a third user. This feature allows users to customize and filter the information they receive when inquiring about an entity of interest.

Figure 9:
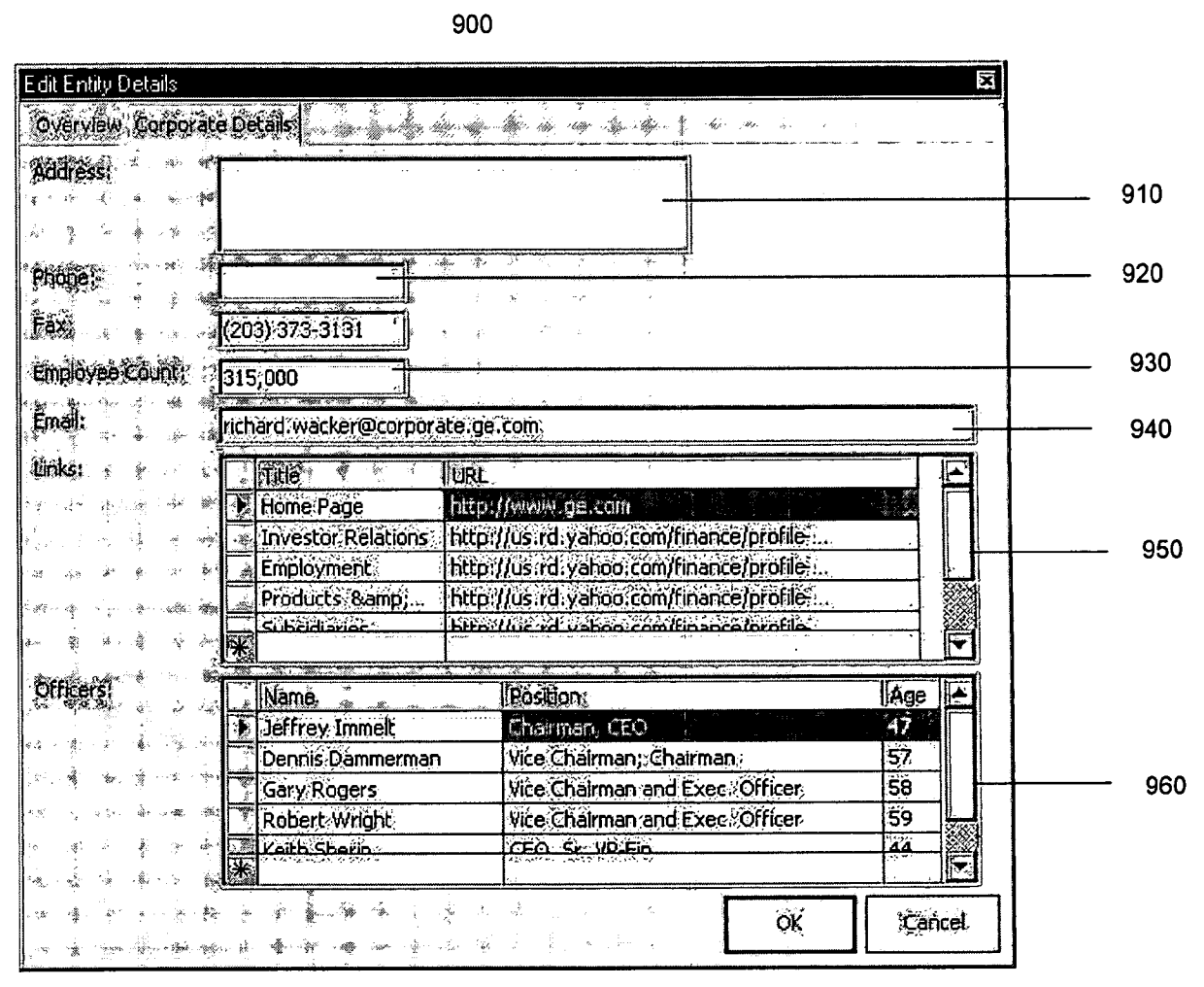

Referring to FIG. 9, in one embodiment, an edit entity details screen 900 includes one or more data fields in which detailed data may be entered describing an entity. For example, if an entity being described is a corporation, an address data field 910 may be used to enter the physical location of the corporation. Similarly, phone and fax data fields 920 may be used to capture the corporation's telephone number and facsimile number, respectively. Other data fields that may be included on the entity details screen 900 for a corporate entity include an employee count data field 930, an email data field 940 for storing the email addresses of one or more contacts at the corporation, a data table 950 of URL addresses representing web pages on the World Wide Web that may be relevant to the corporation, and a data table 960 containing the names and other descriptive information regarding the officers of the corporation, such as their titles, ages, educational backgrounds, previous employers, as well as other data. By allowing analysts to provide detailed information in the entity detail screen 900, the system facilitates the maintenance of significant amounts of very detailed data about entities and people. These contacts often can supply information that is the basis for investment decisions.

Figures 10A, 10B:
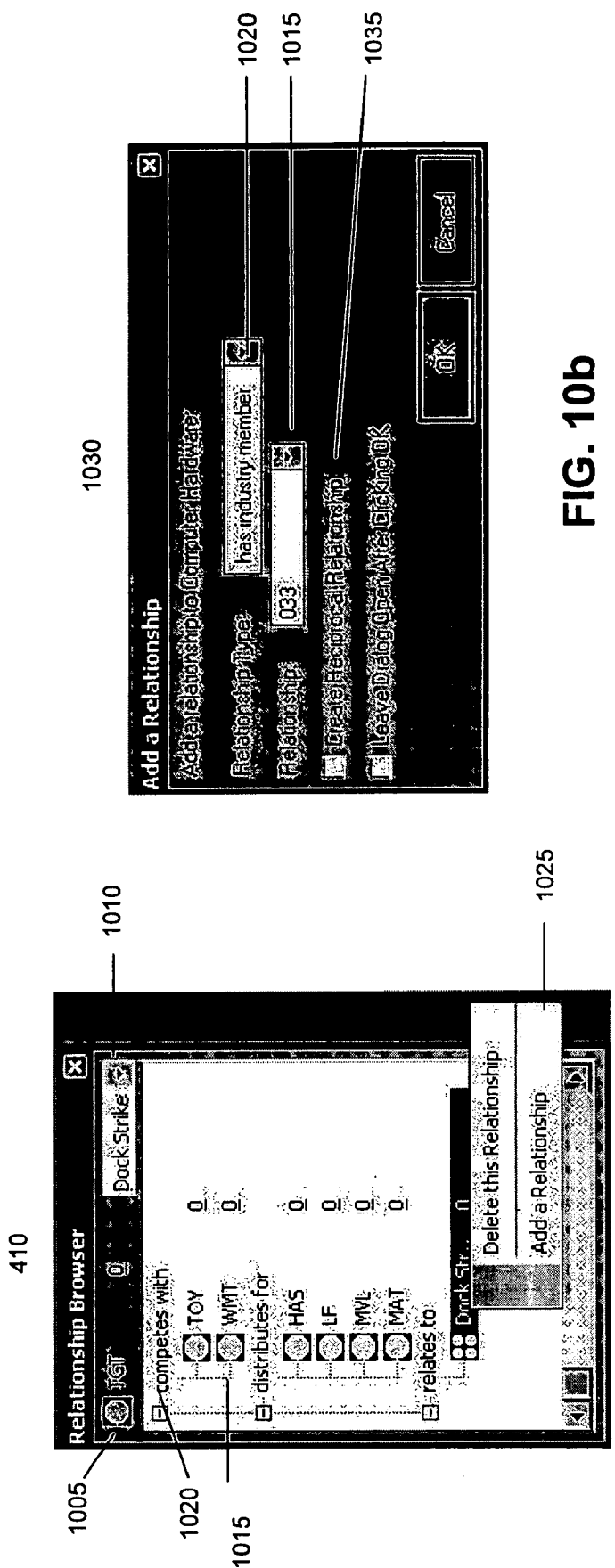
FIG. 10a is a screen display of the relationship browser module in an embodiment of the client of FIG. 4.
FIG. 10b a screen display of the add new relationship module in an embodiment of the client of FIG. 4.

Referring to FIGS. 10a and 10b, in one embodiment, the relationship browser module 410 displays a current entity 1005, other entities 1015 to which the current entity 1005 has been related, the currently selected related entity 1010, the type of relationships 1020, and provides the ability to create new relationships using the add a relationship option 1025. For example, the current entity 1005 may be a large retail chain. The relationship types 1020 that may be relevant to such an entity may be the "competes with," distributes for," and "relates to" relationships. More particularly, if a user is interested in a retail chain that sells toys, the entities listed under the "competes with" relationship type may include other large retailers that also sell toys. Furthermore, the entities listed under the "distributes for" relationship type may include toy manufacturers, and the entities listed under the "relates to" relationship type may include topics such as "dock strike" if the user determines such an event could potentially affect the financial performance of the current entity 1005.

The relationship browser may contain iconic representations for each entity called entity icons. Each entity icon may include a graphical representation of the entity's type, an activity number value representing the number of system notifications generated for that entity during some previous period of time (24 hours, 1 week, 1 month, etc.), as well as other information. In some embodiments, the activity number can be calculated dynamically, and the formula employed to determine the activity number can be based on any system event for an entity and/or its related entities.

New relationships may be created using the add a relationship function 1025 and the add a relationship screen 1030, which includes data fields for selecting the relationship type 1020 and the related entity 1015, and a check box 1035 for creating reciprocal relationships. In some embodiments, the relationship types are limited to a fixed set of relationships defined by a central administrator and stored in the database 220, as described above. In some embodiments, the relationship types, the entity types, the direction and reciprocal nature of the relationships, and the rules governing the application of the relationships to the entities may be defined by individual users. In some embodiments, the users have complete control over the creation of these objects, and how they are instantiated within the entity-relationship network, and in some cases an administrator retains some control over the rules governing the creation and use of the objects. In some embodiments, the user-created objects can be shared with other users of the application, other members of particular groups of users, or kept private.

Figure 11:
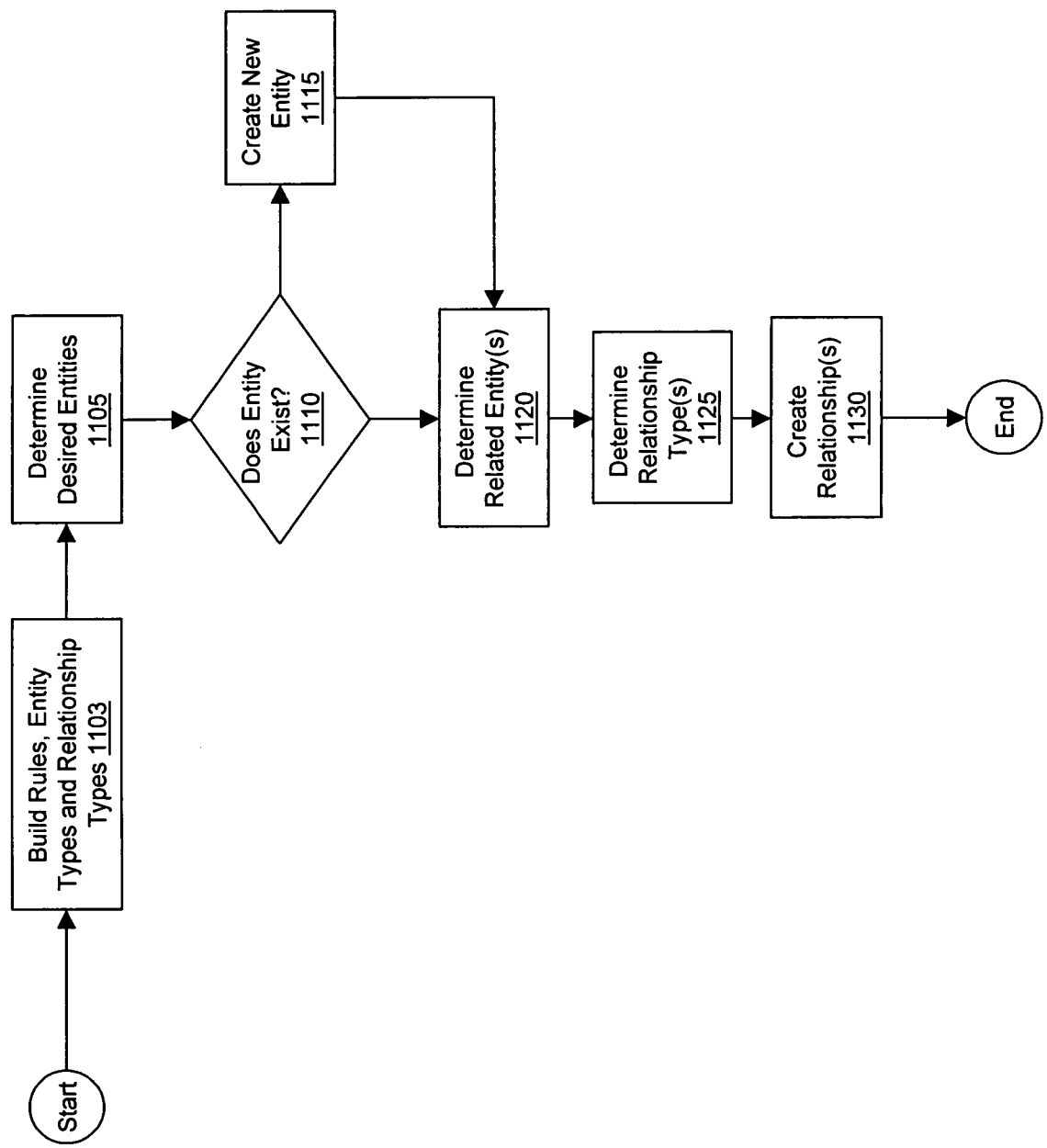
FIG. 11 is a flowchart of an embodiment of a method according to the invention.

FIG. 11 illustrates one embodiment of a method for defining entities and the relationships among the entities. Initially, a user, administrator, or other supplier of data builds an initial set of rules, entities, and relationship types (STEP 1103). A user may then determine if additional entities are necessary to adequately model the markets, industries, or topics of interest (STEP 1105). The user then determines if the entities exist in the initial set (DECISION STEP 1110), for example, by using the entity finder module 422 described above. If one or more of the entities does not exist, the user then creates the entities (STEP 1115) using the create new entity screen 740. Once the entities are created, the user then determines which entities are to be related (STEP 1120). The user then determines the relationship type (STEP 1125) that best describes the relationship, and creates the relationship (STEP 1130) using the relationship browser module 410.

Because users of the system are able to define entities and provide descriptive information about the entities, the data can be customized to the areas of interest of a particular firm, group, or individual. For example, if an analyst firm follows a particular investment strategy that runs contrary to widely-held principles, or has uncovered derivative influences on a company or industry that other analysts have not, the ability to create and modify the entities is valuable. In one exemplary case, an analyst or firm may have determined that certain weather patterns (exceptionally warm winters, for example) have a statistically significant impact on automobile sales during certain months. By creating a topic entity called "weather" and an "influences" relationship to an industry entity titled "automotive", an analyst reviewing automobile manufacturers as investment opportunities would have the benefit of knowing that reports of the current weather pattern will appear along with other data that may influence the performance of companies in the auto industry.

In some embodiments, the relationship may be a unidirectional relationship—e.g. a company entity may have a "member of" relationship to an index entity. In some embodiments, the user may determine that upon creating the first relationship, a second, reciprocal relationship is warranted, thus creating a bi-directional relationship. For example, if a user instructs the system to create a "sells to" relationship from company A to company B, and further instructs the system to create a reciprocal relationship, the system can automatically create a "buys from" relationship from company B to company A. In some embodiments, the creation of the reciprocal relationships can be governed by the rules 505. In such a case, when a user creates a relationship from a first topic to a second topic, only the valid reciprocal relationships are provided. Using the example above, the rules 505 may limit the valid reciprocal relationships to "buys from." By providing this option, the system provides a quick method for creating sets of relationships based on reciprocal associations between entities.

Figure 12B:
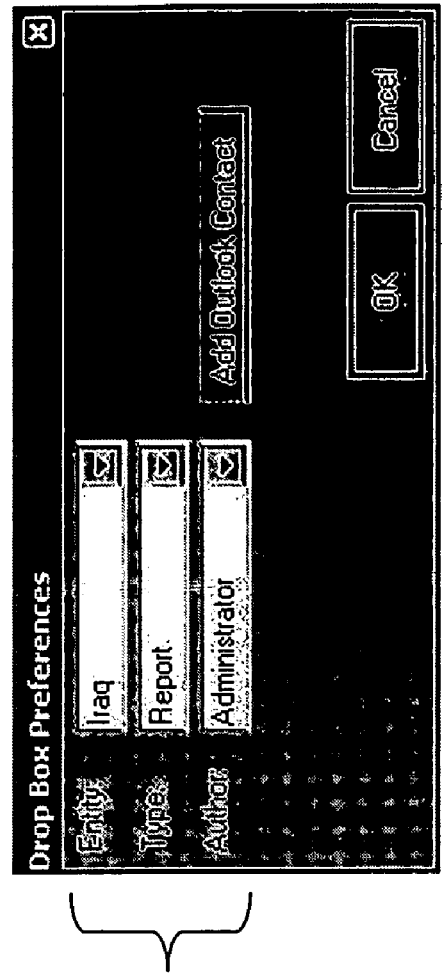
FIG. 12b is a screen display of the drop box preferences module in an embodiment of the client of FIG. 4.
Figure 12A:
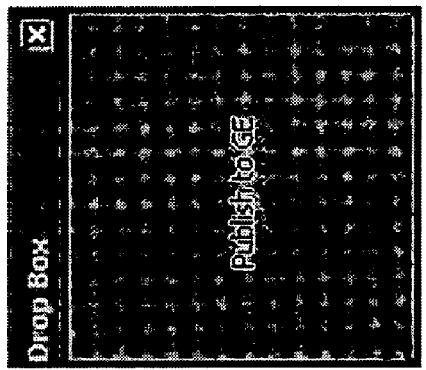
FIG. 12a is a screen display of the drop box module in an embodiment of the client of FIG. 4.

Referring to FIG. 12, in one embodiment, the drop box module 1205 facilitates the saving of an information item to the file system 216 or database 220 without having to use the client applications software 122. The drop box module 1205 remains active on the client 108 and visible on the user interface 124, and allows a user to deposit a document, spreadsheet, or other file directly from one location on the client 108 or other computer connected to the client 108 over the network 112 to the file system 216 by "dragging and dropping" the file onto the drop box module 1205. In some embodiments, default values for characteristics of the information items may be set using the drop box preferences module 1210.

For example, the user may be reviewing numerous information items about a particular entity, and set the drop box default fields 1215 to reflect the current entity, the type of data being reviewed, and the author of the information items, thus allowing the user to associate numerous items with a particular entity quickly.

Figure 13:
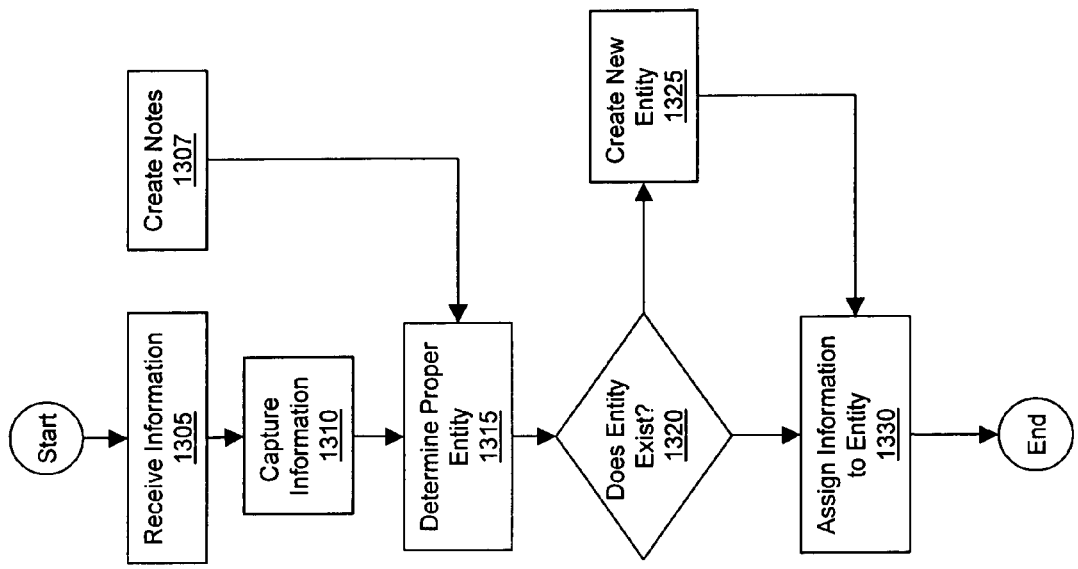
FIG. 13 is a flowchart of an embodiment of a method according to the invention.

FIG. 13 illustrates one embodiment of a method for associating information with an entity. Initially, a user receives information relating to one or more of the entities of interest to the user (STEP 1305) and in some cases creates notes relating to an entity of interest (STEP 1307). For information received from another source, the user then captures the information (STEP 1310) using one or more of the methods described above. The user then determines the proper entity to which the information should be associated (STEP 1315). The user then determines if the entity to which the information should be associated exists (STEP 1320), and if the entity does not exist, creates the new entity (STEP 1325) using the methods described above. The user may then assign the information to the entity (STEP 1330), for example, using one of the application plug-in adapters 404 or the drop box module 1205 above. Because the applications into which the adapters 404 plug-in are already in use and the analysts are familiar with their operation, minimal additional training is necessary for an analyst to start using the system.

For example, a user may receive an email with a document attached to the mail message describing a company's product launch strategy for an upcoming software release. By selecting the attached document, the client 108 may recognize the client application 122 needed to view the document, and launch the application 122, if not already running. The user then determines the entity with which the document should be associated, and highlights the relevant portion(s) of the document. The user then selects the plug-in 430 in the client application 122, and the information is saved to the file system 216, with the associations provided by the user.

Figure 14:
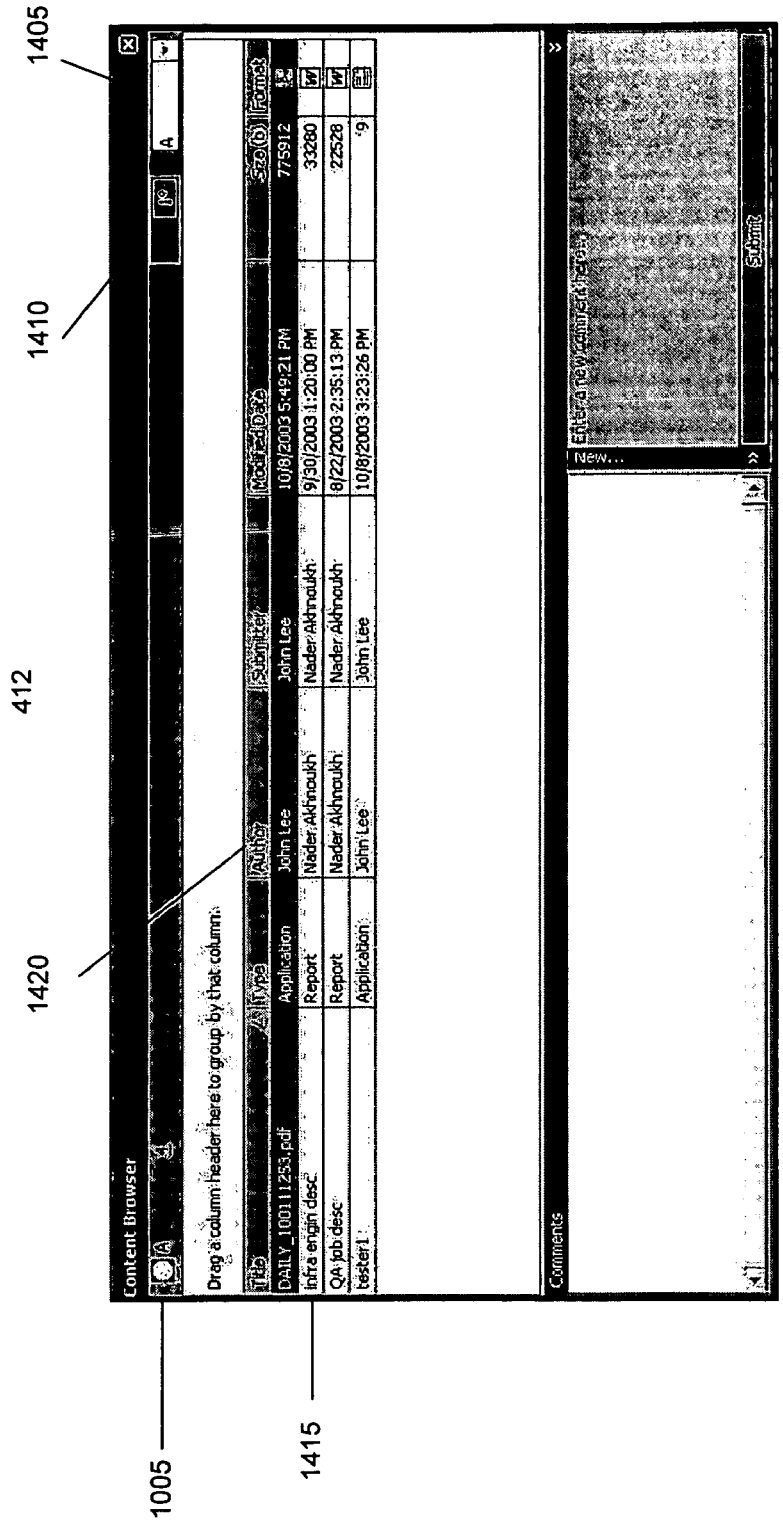
FIG. 14 is a screen display of the content browser module in an embodiment of the client of FIG. 4.

Referring to FIG. 14, in one embodiment, the content browser module 412 facilitates requests for and review of information associated with a current entity 1005 and in some embodiments, entities related to a current entity. The content browser module 412 includes the current entity of interest 1005, a select entity data field 1405, a display related information toggle 1410, summaries of each information item 1415 retrieved from the database system 220 or file system 216, and an indication 1420 of who authored the information items 1415, as well as other descriptive information about the item.

The select entity data field 1405 allows a user to change the current entity 1005 to a new current entity, and thus review information items 1415 associated with a new current entity. The display related information check box 1410 allows the user to indicate whether the list of information items 1415 will include information items for the current entity 1005 only (unselected), or for the current entity 1005 and the entities related to it (selected). For example, if a user was interested in reviewing the information associated with a computer manufacturer, the user could select the entity name for that corporation from the select entity data field 1405, and the summaries of each information item 1415 associated with that entity would be listed. In addition, a user may be interested in the derivative influences potentially affecting the computer manufacturer, e.g. the companies that supply the chip sets, the stock exchange on which it is listed, etc. In such a case, the user selects the display related information check box 1410 and therefore receives information associated with the other corporations, industries, and topics that are related to the computer manufacturer. This allows the user to gain a broader perspective of the factors that may influence the company, and therefore affect its financial performance.

In some embodiments, the summaries of each information item 1415 may include information about the information items. For example, the summaries may include a title, the type of file (voice clip, financial report, press release, as well as others), the author's name, the date on which the file was last modified, the size of the file, the format of the file (such as Word for Windows, Excel, PDF, HTML, as well as others), and comments about the file. In some embodiments this information is static and cannot be changed by individual users, where as in other embodiments, the ability to modify the summary information can be assigned to individual users or groups of users.

Figure 15A:
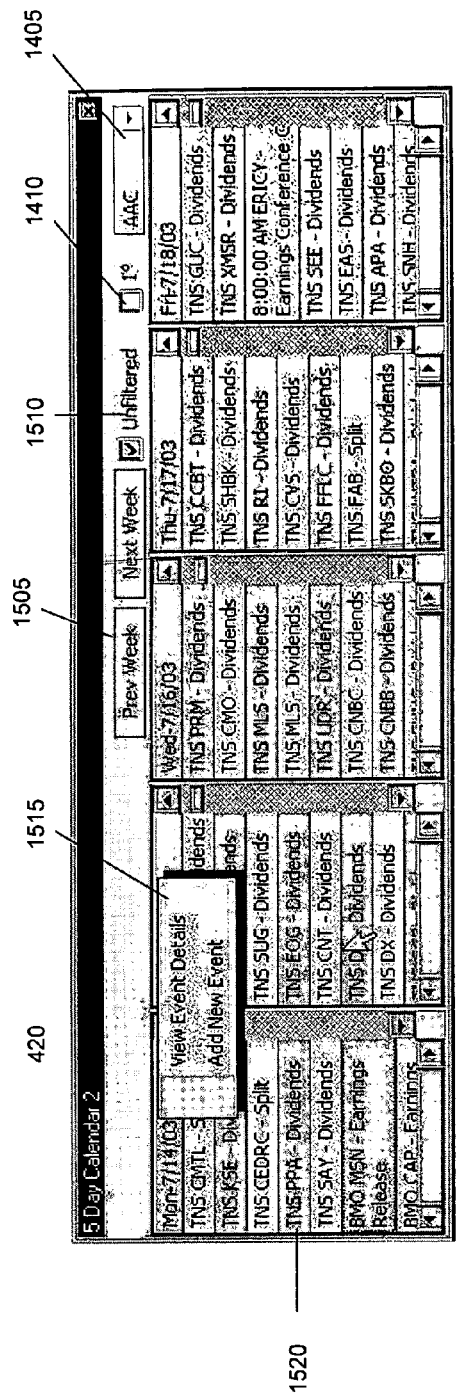
FIG. 15a is a screen display of the calendar module in an embodiment of the client of FIG. 4.
Figure 15B:
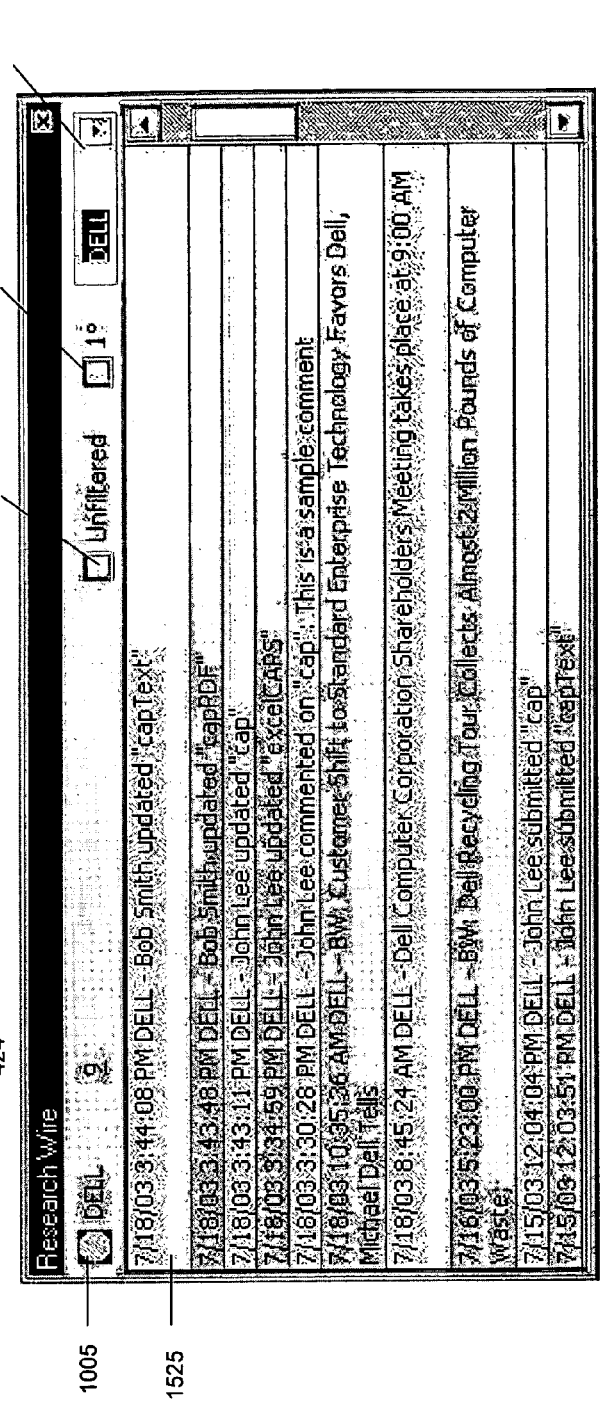
FIG. 15b is a screen display of the research wire module in an embodiment of the client of FIG. 4.

Referring to FIGS. 15*a* and 15*b*, in one embodiment, the calendar module 420 and research wire module 424 further facilitate the review of information associated with a current entity 1005 and in some embodiments, entities related to a current entity. In both modules, the current entity data selection window 1405 and display related information check box 1410 perform similar functions as on the content browser module 412 described above. The calendar module 420 further includes date navigation buttons 1505, an unfiltered selection box 1510, an action menu 1515, and summaries of information items 1520 organized by date. In one embodiment, the date navigation buttons 1505 allow a user to scroll to a previous week or subsequent week, and review the events scheduled during that time period. In other embodiments, the time periods may be hours, days, months, quarters, years, or other periods of time into which events can be grouped. In another embodiment, the unfiltered selection box 1510 allows a user to instruct the calendar module 420 to display all events for all companies (unchecked) or only those events related to the company or entity selected in the entity data selection window 1405 (checked).

The research wire module 424 further includes summaries 1525 of information items received from either internal or external news and broadcast sources via the adapters 312 and 316. In one embodiment, the summaries 1525 include the date and time an information item was published, the company about which the item pertains, and a text summary of the item. By clicking on the summary 1525 of an information item, the user may then review the entire contents of the item.

FIG. 16 illustrates one embodiment of a method for retrieving information associated with one or more entities. The user begins by selecting an entity of interest (STEP 1605) using the select entity data field 1405 on the content browser module 412. The client software 120 then requests (STEP 1610) the information associated with the selected entity from the server 104, which retrieves the requested information (STEP 1615). The server then determines (DECISION STEP 1620) if the display related information check box 1410 is selected. If the display related information check box 1410 is selected, the server 104 also retrieves the data (STEP 1625) associated with the entities related to the selected entity. Once the complete set of information is retrieved from the file system 216 and database system 220, it is received (STEP 1630) by the client 108 and presented to the user for review. Because the relationships were previously established and the information was associated with the first entity, the analyst needs no additional knowledge about the industry or entity to receive the derivative information. In some embodiments where updates to entities, relationships, rules, or information is asynchronously provided to the client 108, the user receives updated information (STEP 1635) using one or more of the methods described above.

For example, an analyst may be following the semiconductor industry in general, and have a particular interest in the XYZ Semiconductor Company ("XYZ Co."). Prior to the analyst's inquiry for information about XYZ Co., another analyst created a "supplier/customer" relationship between XYZ Co. and ABC Computer Company and a "relates to" relationship between XYZ Co. and a topic identified as "Trade with China." Using the content browser module 412, the analyst then selects XYZ Co. from the select entity data field 1405. Furthermore, the analyst may be interested in information directly associated with XYZ Co., and also information associated with related entities. To receive this information, the analyst checks the display related information check box 1410. The server 104 then retrieves the information associated with XYZ Co., ABC Computer Co, as well as any information associated with the topic "Trade with China." This facilitates a more complete analysis of XYZ Co.'s current and future performance because an increase in demand for computers manufactured by ABC Co. may directly influence the demand for semiconductors manufactured by XYZ. Co. Likewise, political and economic events that may affect the importation of goods from China may also affect XYZ Co. if their manufacturing operations are located there.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method of providing information items, the method comprising:
   providing a plurality of entities, each entity having a entity type;
   providing a plurality of relationships among the entities, each relationship of the plurality of relationships having a relationship type and a relationship direction;
   constructing an entity-relationship network comprising the entities and the relationships;
   receiving a plurality of information items;
   facilitating association of each information item with at least one corresponding entity;
   receiving, by a computer, a request for information items associated with a selected one of the plurality of entities, the request including a first degree of separation and a maximum degree of separation;
   identifying a first subset of the plurality of entities by traversing the entity-relationship network by (i) starting at the selected entity and following relationships associated therewith to identify entities having a direct relationship with the selected entity, (ii) following relationships associated with entities having a direct relationship with the selected entity to identify additional entities having an indirect relationship with the selected entity, and (iii) repeating step (ii) by replacing the entities having a direct relationship with the selected entity with entities having an indirect relationship with the selected entity, until the first degree of separation from the selected entity is reached, thereby determining the first subset based on the selected entity and the relationship types and relationship directions of the entity-relationship network;
   identifying a second subset of the plurality of entities by traversing the entity-relationship network by (x) starting at the first subset of the plurality of entities and following relationships associated therewith having a minimum strength indicator to identify entities having a direct relationship of a specified strength with each of the entities in the first subset of the plurality of entities, (y) following the relationships associated with the entities having a direct relationship of a specified strength with the entities of the first subset to identify additional entities having an indirect relationship with the selected entity, and (z) repeating step (y) by replacing the entities of the first subset with entities having an indirect relationship of a specified strength with the selected entity, until the maximum degree of separation from the selected entity is reached, thereby determining the second subset based on the selected entity, the relationship types, the relationship directions and the relationship strengths of the entity-relationship network; and
   providing the information items associated with both the first and second subsets of the plurality of entities.

2. The method of claim 1 wherein the entity types comprise companies, industries, indices, people, and subjects.

3. The method of claim 1 wherein the relationship direction is one of unidirectional and bi-directional.

4. The method of claim 3 wherein the relationship direction is bi-directional and the relationship type represents a set of reciprocal relationships between the entities.

5. The method of claim 1 wherein one or more of the relationships among the entities are hierarchical.

6. The method of claim 5 wherein the hierarchical relationships comprise one or more of business relationships, legal relationships, formal membership relationships, and informal membership relationships.

7. The method of claim 1 wherein the one or more relationships among the entities are influential.

8. The method of claim 7 wherein the influential relationships comprise one or more of business relationships, legal relationships, formal membership relationships, and informal membership relationships.

9. The method of claim 1 wherein the relationships among the entities comprises both hierarchical and influential relationships.

10. The method of claim 1 wherein the relationships between the entities further comprise a strength indicator.

11. The method of claim 1 wherein the information items comprise at least one of an electronic message, an email, an instant message, a financial report, a voicemail, a web page, a research report, an electronic document, and a press release.

12. The method of claim 1 wherein the information items are received via one or more of an electronic message, electronic mail, instant message, voice message, scheduled database query, or triggered database query.

13. The method of claim 1 wherein the step of associating information items with entities is initiated by a first user of a first computer.

14. The method of claim 13 wherein the request for information items associated with the selected entity is initiated by a second user of a second computer.

15. The method of claim 1 wherein the information items are provided using one or more of email, voicemail, computer display screen, personal data assistant, and print.

16. A system for presenting information, comprising:
   a collection of application plug-in adapters implemented as software stored on a client computer, each adapter comprising:
      an entity definition module for defining entities;
      a relationship definition module for defining relationships among the entities and attributing a relationship type and relationship direction to each relationship;
      a receiver for receiving information; and
      an information management module for associating the received information with at least one of the entities; and
   a central server in communication with each of the application plug-in adapters and configured to receive therefrom the defined entities, wherein the central server includes a processor and a memory, the defined relationships and the information associated with the entities and further comprising;
   a data storage server for storing the defined entities, the defined relationships and the information associated with the entities; and
   an application server implemented as application software stored on the central server and configured to:
      (i) receive a request for information associated with one of the entities, the request including a first degree of separation and a maximum degree of separation;
      (ii) identify a first subset of the plurality of entities by traversing the entity-relationship network by:

(x) starting at selected entity and following relationships associated therewith to identify entities having a direct relationship with the selected entity, (y) following relationships associated with entities having a direct relationship with the selected entity to identify additional entities having an indirect relationship with the selected entity, and (z) repeating step (y), replacing the entities having a direct relationship with the selected entity with entities having an indirect relationship with the selected entity until the specified degree of separation from the selected entity is reached, thereby determining the first subset based on the selected entity and the relationship types and relationship directions of the entity-relationship network;

(iii) identify a second subset of the plurality of entities by traversing the entity-relationship network by:

(x) starting at the first subset of the plurality of entities and following relationships associated therewith having a minimum strength indicator to identify entities having a direct relationship of a specified strength with each of the entities in the first subset of the plurality of entities, (y) following the relationships associated with the entities having a direct relationship of a specified strength with the entities of the first subset to identify additional entities having an indirect relationship with the selected entity, and (z) repeating step (y) by replacing the entities of the first subset with entities having an indirect relationship of a specified strength with the selected entity, until the maximum degree of separation from the selected entity is reached, thereby determining the second subset based on the selected entity, relationship types, the relationship directions and the relationship strengths of the entity-relationship network;

(iv) retrieve from the data storage server information associated with the first and second subsets of the entities and (v) display the retrieved information.

17. The system of claim 16 wherein the receiver receives one or more of an electronic message, an email, an instant message; a streaming data feed, a voice message, and a web page.

18. The system of claim 16 further comprising a rules engine for governing the permissible relationship types among the entities.

19. The system of claim 16 wherein the relationships between entities are one or more of unidirectional and bi-directional.

20. The system of claim 19 wherein the relationships between entities are bi-directional and represent a reciprocal relationship between the entities.

21. The system of claim 16 wherein the relationships between the entities comprise a strength indicator.

22. The system of claim 16 wherein the central server further comprises a messaging module for distributing modifications made to one of the entities, the relationships, and the rules to users of the system.

23. The system of claim 22 wherein the messaging module distributes the modifications asynchronously.

24. The system of claim 22 wherein the messaging module distributes the modifications on demand.

25. The system of claim 16 wherein the central server further comprises a permissions module for enforcing user access privileges to one or more of the entities, the relationships, and the information items associated with the entities.

\* \* \* \* \*